(12) United States Patent
Moran et al.

(10) Patent No.: US 10,631,478 B2
(45) Date of Patent: Apr. 28, 2020

(54) AUTOMATED CHRISTMAS TREE WATERING SYSTEM

(71) Applicant: CHRISTMAS TREE BUTLER, INC., Saratoga Springs, NY (US)

(72) Inventors: Peter Moran, Ballston Spa, NY (US); David Mathieu, Glastonbury, CT (US); Jim Sener, Glastonbury, CT (US); Scott Smith, Glastonbury, CT (US); Jesse Kruska, Glastonbury, CT (US)

(73) Assignee: CHRISTMAS TREE BUTLER, INC., Saratoga Springs, NY (US)

( * ) Notice: Subject to any disclaimer, the term of this patent is extended or adjusted under 35 U.S.C. 154(b) by 332 days.

(21) Appl. No.: 15/625,439

(22) Filed: Jun. 16, 2017

(65) Prior Publication Data

US 2018/0125022 A1 May 10, 2018

Related U.S. Application Data

(60) Provisional application No. 62/419,150, filed on Nov. 8, 2016.

(51) Int. Cl.
*A01G 27/00* (2006.01)
*A47G 33/12* (2006.01)

(52) U.S. Cl.
CPC ......... *A01G 27/005* (2013.01); *A01G 27/003* (2013.01); *A47G 33/12* (2013.01); *A47G 2033/1286* (2013.01); *A47G 2033/1293* (2013.01)

(58) Field of Classification Search
CPC ............ A47G 2033/1293; A47G 33/12; A47G 33/1206; A47G 2033/1286; A47G 33/1213; A01G 27/008; A01G 27/005; Y10T 137/3149; Y10T 137/3331; A47L 15/4223
USPC ........................................................ 47/40.5
See application file for complete search history.

(56) References Cited

U.S. PATENT DOCUMENTS

| | | | | |
|---|---|---|---|---|
| 4,064,896 A | * | 12/1977 | Trenary .................. | F16K 15/04 137/218 |
| 4,148,155 A | * | 4/1979 | Allen .................... | A01G 27/006 119/77 |
| 4,361,938 A | * | 12/1982 | Emery .................. | F16G 11/103 114/218 |
| 4,527,353 A | * | 7/1985 | Newby .................. | A01G 25/16 222/54 |

(Continued)

*Primary Examiner* — Peter M Poon
*Assistant Examiner* — Jeffrey R Larsen
(74) *Attorney, Agent, or Firm* — Schmeiser, Olsen & Watts, LLP

(57) ABSTRACT

An automated fluid maintenance system comprising a sensor system and a pump configured to deliver fluid from a refillable reservoir to a container holding a Christmas tree, such as a Christmas tree stand. Embodiments of the system include tree attachment hardware capable of controlling the flow, delivery and direction of the fluid being pumped from the of the fluid system's reservoir to a fluid-holding container of the Christmas tree stand and further capable of securing the point of fluid delivery to the tree stand and/or the tree itself. The tree attachment device universally attaches to any available tree stand, even the most complex stand mechanisms, sizes and shapes that obstruct the path to the Christmas tree being maintained by the automated fluid delivery system of the present application.

25 Claims, 20 Drawing Sheets

(56) References Cited

U.S. PATENT DOCUMENTS

| | | | | | |
|---|---|---|---|---|---|
| 5,009,028 | A | * | 4/1991 | Lorenzana | A47G 33/12 |
| | | | | | 119/77 |
| 5,279,071 | A | * | 1/1994 | McDougall | A01G 27/003 |
| | | | | | 428/16 |
| 6,300,581 | B1 | * | 10/2001 | Dweck | H01H 29/20 |
| | | | | | 200/61.47 |
| 6,568,127 | B1 | * | 5/2003 | Kalman | A47G 33/12 |
| | | | | | 47/40.5 |
| 7,082,971 | B2 | * | 8/2006 | Gauthier | A01G 27/008 |
| | | | | | 119/72 |
| 2007/0062110 | A1 | * | 3/2007 | Lofboom | A01G 27/005 |
| | | | | | 47/48.5 |
| 2011/0214345 | A1 | * | 9/2011 | Rasschaert | A47G 33/12 |
| | | | | | 47/40.5 |
| 2013/0249689 | A1 | * | 9/2013 | Gustafsson | A01G 25/14 |
| | | | | | 340/539.22 |
| 2015/0237814 | A1 | * | 8/2015 | Moran | A01G 27/003 |
| | | | | | 47/66.7 |

* cited by examiner

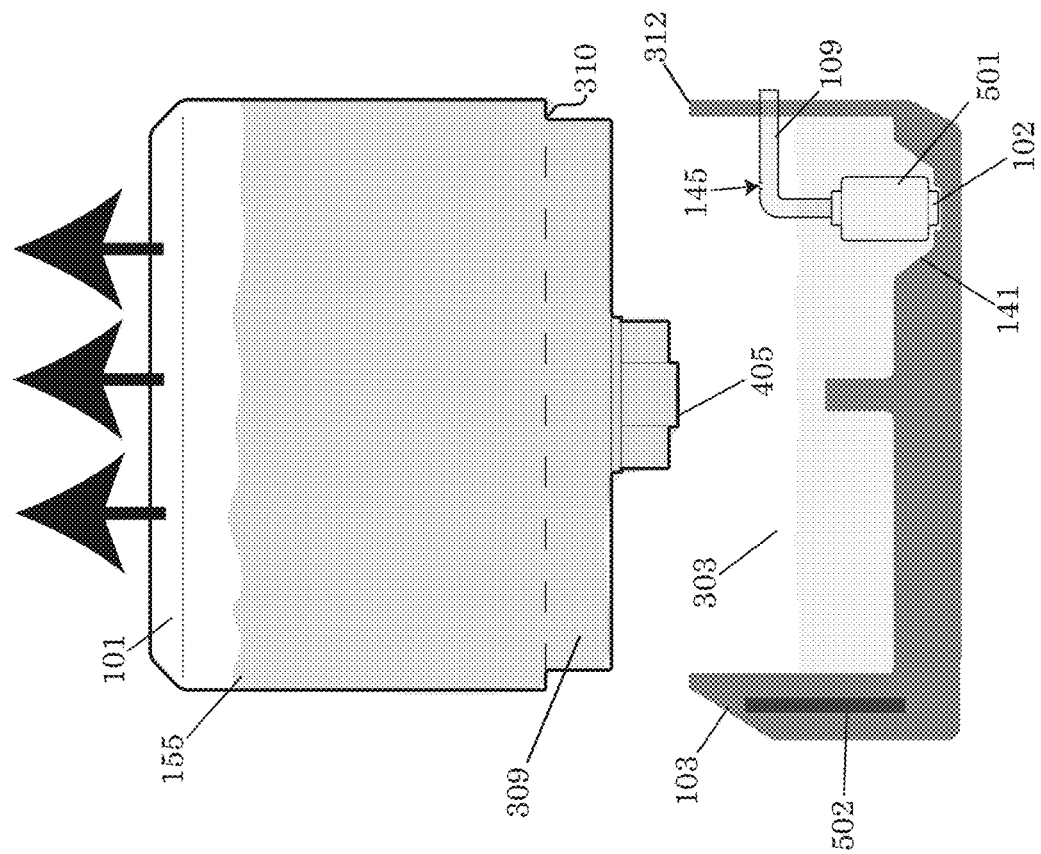
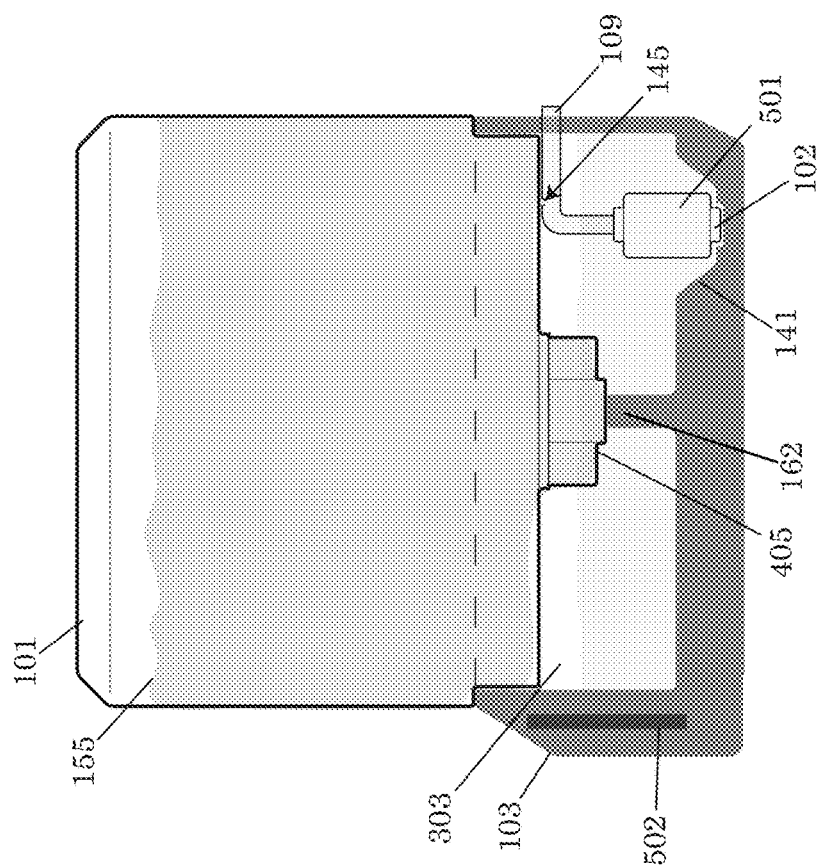

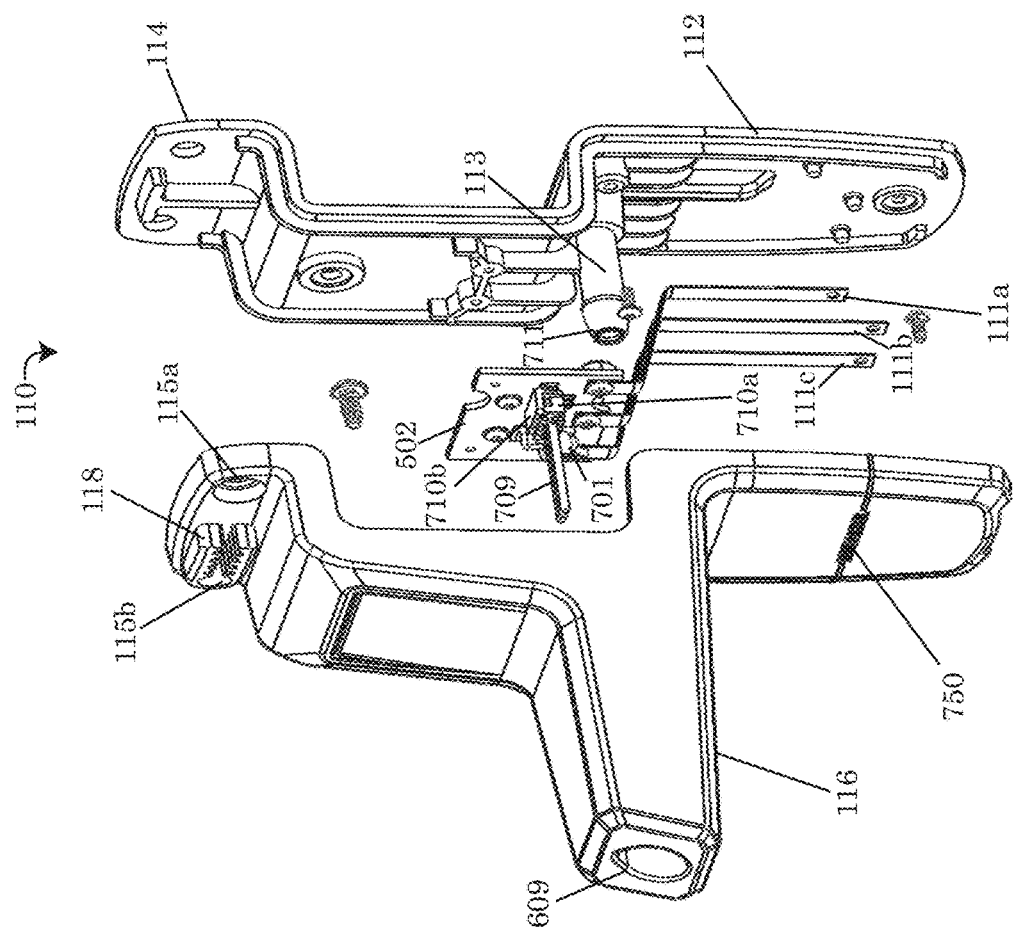
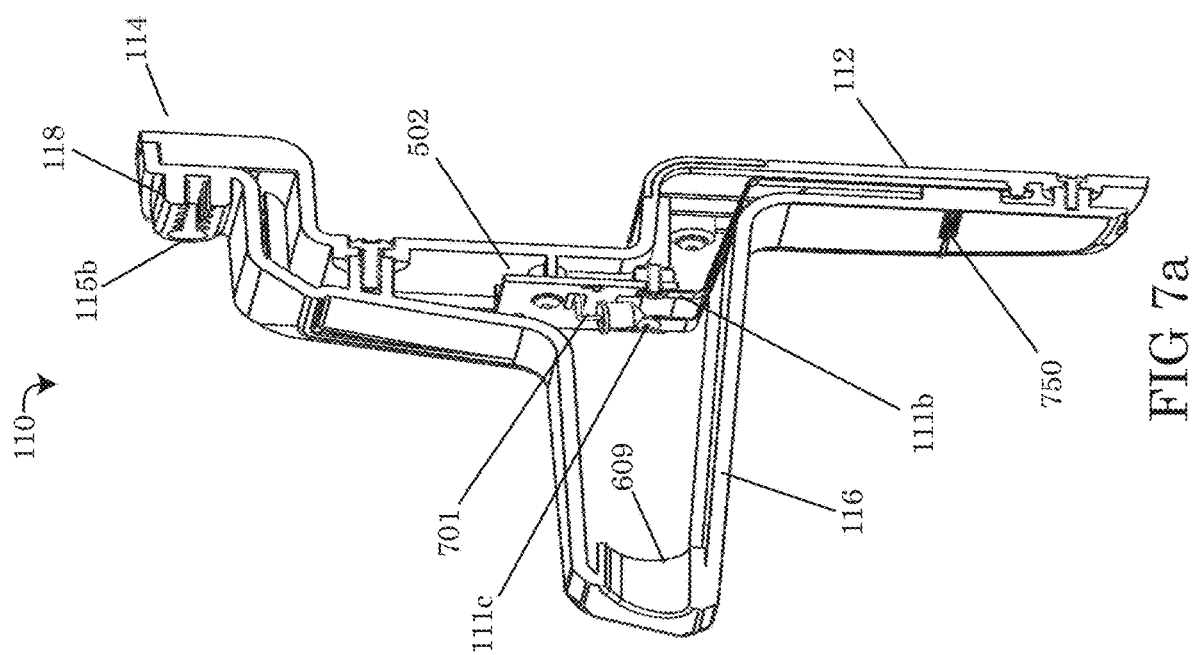

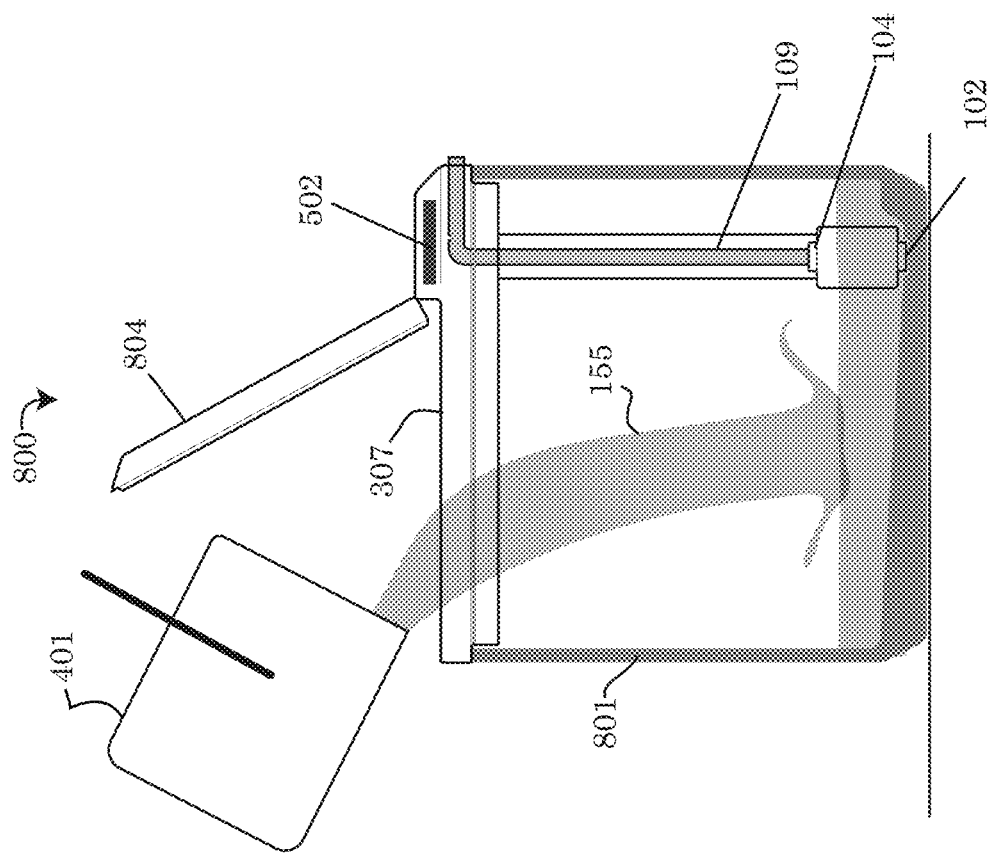
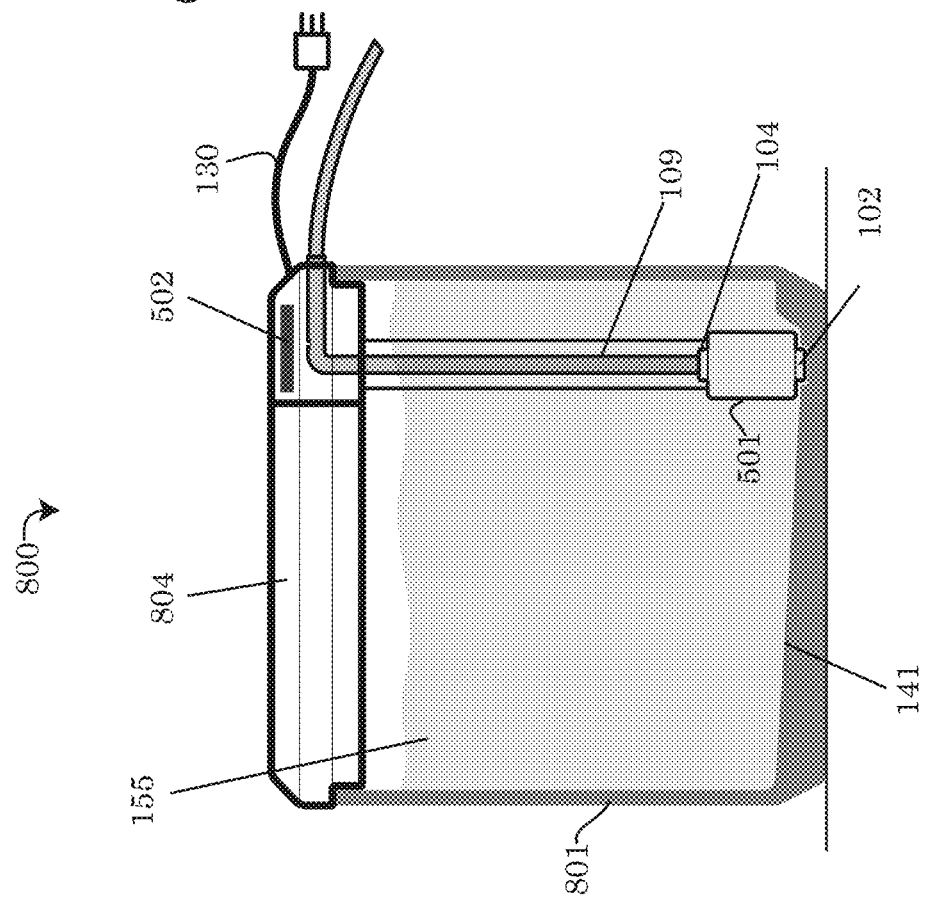
FIG 8a
FIG 8b

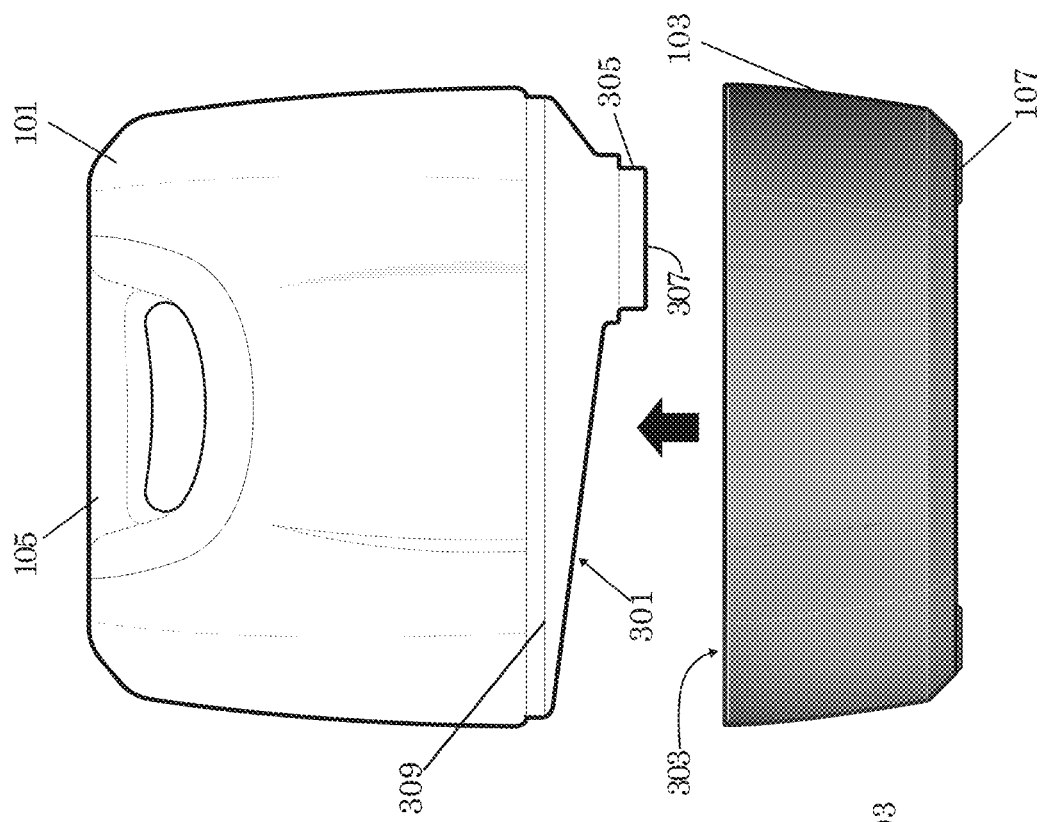
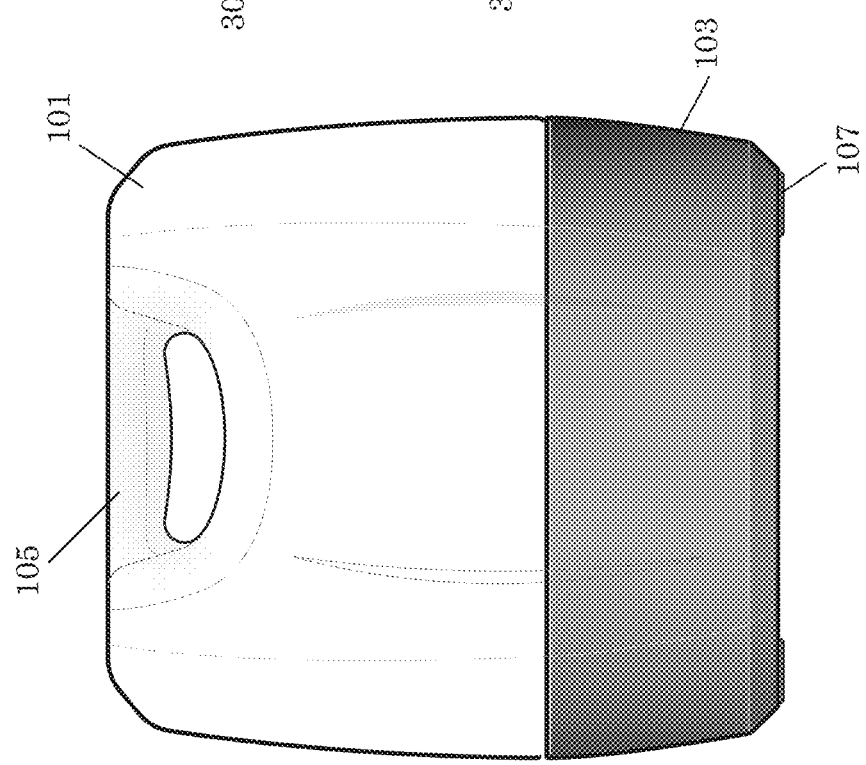

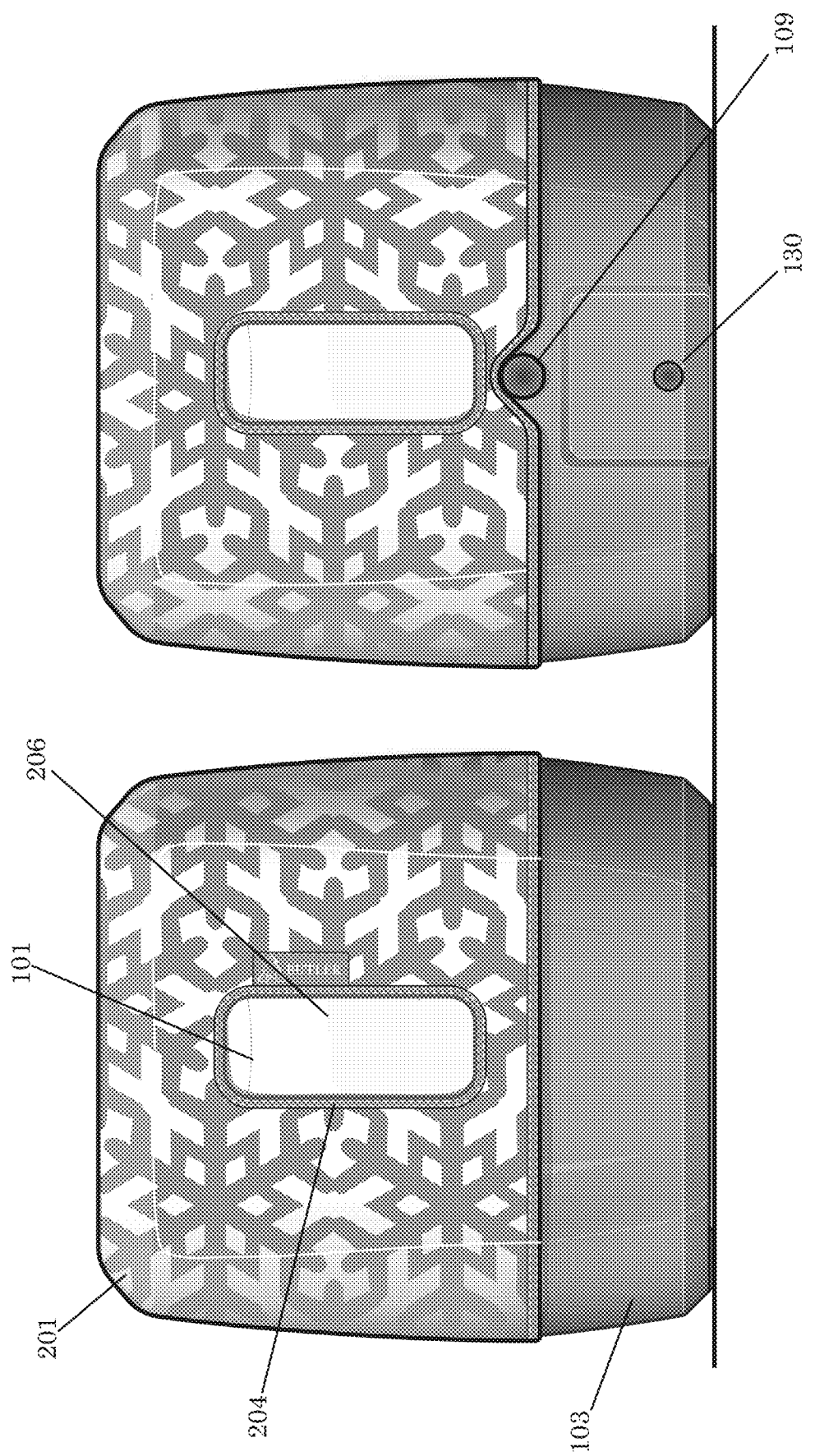

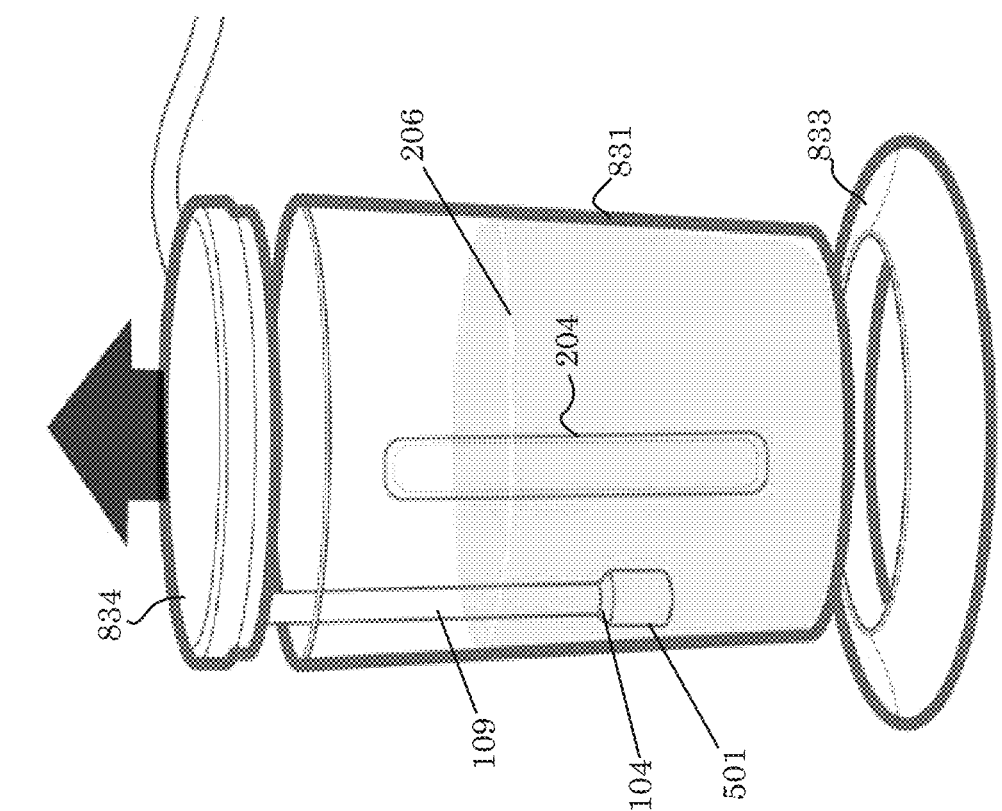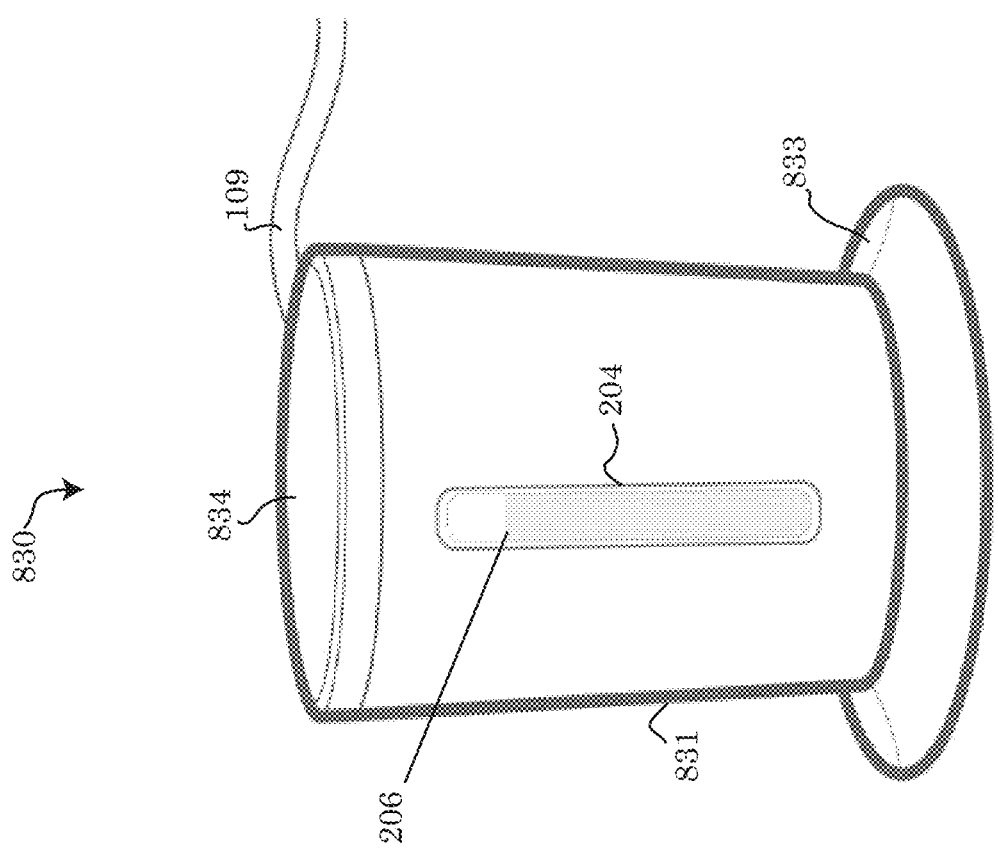

AUTOMATED CHRISTMAS TREE WATERING SYSTEM

CROSS REFERENCE TO RELATED APPLICATIONS

This application claims priority and benefit of U.S. Patent Application No. 62/419,150 entitled AUTOMATED CHRISTMAS TREE WATERING SYSTEM, filed Nov. 8, 2016, the content of which is incorporated herein by reference.

FIELD OF TECHNOLOGY

The following relates to an automated system, apparatus and method for watering a Christmas tree, and more specifically to embodiments of an automated Christmas Tree watering system that detects fluid levels currently available in the tree's reservoir or stand and resupplies fluid automatically to maintain the fluid level above a minimally acceptable level.

BACKGROUND

Plants, trees and other vegetation planted, grown, and cared for by individuals require frequent maintenance, including watering or replacement of liquid residing in the containers holding the vegetation. Often, the liquid medium present in the pots and containers holding the vegetation and soil, may have variable rates of absorption or evaporation. This presents a challenge to individuals caring for the vegetation because consistently maintaining plant life can be demanding and viewed as a chore. Often individuals may forget to replenish the fluid medium, particularly when the medium requires replenishment constantly or at variable intervals. Specialized systems are commercially available which provide liquid replenishment. Commercially available systems however, are inconsistent and fail to accurately deliver fluid automatically as the plants or trees require the fluid to be delivered.

The currently available systems for maintaining live vegetation are not particularly suitable for maintaining Christmas trees. Specifically, currently available systems are directed toward maintaining moisture levels in a potted plant having a soil medium. The presence of soil in the currently available watering systems may prevent these systems from having the ability to automatically maintain fluid levels at a desired minimal level. Unlike known systems that rely on using capillary action and metered delivery systems set to deliver a specific amount of fluid on a timer or at a pre-calculated fluid delivery rate after a calibration period, the current system described herein delivers fluid automatically on demand to a desired fill point that may be maintained by the disclosed systems as needed. Currently available systems do not take into account the changing needs of the Christmas tree being nourished, the lack of soil needing to be moistened, nor the increasing or decreasing fluid requirements of the of the Christmas tree over time. Moreover, the existing systems employ unreliable liquid detection methods. Often times, containers relying on the known, unreliable methods, to activate a switch will malfunction, leaving the switch either stuck in a closed or open position, causing floods or burning out electrical systems that may be used, creating a potential fire hazard.

SUMMARY

Embodiment of this disclosure relate generally to an automated Christmas tree watering system comprising a base unit having an interior cavity housing a pump having an intake and an output connected to a first end of a conduit; a fluid reservoir positioned within the interior cavity of the base unit, wherein said fluid reservoir is configured to supply fluid from inside the fluid reservoir to the interior cavity of the base unit; a first siphon break positioned along the conduit; a nozzle connected to a second end of the conduit; and a second siphon break created by an outlet of the nozzle.

BRIEF DESCRIPTION OF THE DRAWINGS

Some of the embodiments will be described in detail, with reference to the following figures, wherein like designations denote like members, wherein:

FIG. 3a depicts a front view of an embodiment of a reservoir and a base of an automated Christmas tree watering system in a first configuration.

FIG. 3b depicts the reservoir and base of the automated watering system of FIG. 3a in a second configuration, detaching the reservoir from the base.

FIG. 4b depicts an isometric view of an embodiment of an interior cavity of a base unit of the Christmas tree watering system of FIG. 4a.

FIG. 7a depicts a cut-away view of an embodiment of a tree attachment device.

FIG. 7b depicts an exploded view of the embodiment of the tree attachment device of FIG. 7a.

FIG. 8a depicts a partial cut-away view of an alternative embodiment of a Christmas tree watering system in a first configuration.

FIG. 8b depicts a partial cut-away view of the alternative embodiment of FIG. 8a, in a second configuration.

FIG. 8c depicts a front view of another alternative embodiment of a reservoir and base of a Christmas tree watering system in a first configuration.

FIG. 8d depicts the embodiment of FIG. 8c in a second configuration, separating the reservoir from the base of the Christmas tree watering system.

FIG. 8e depicts a front view of a third alternative embodiment of a Christmas tree watering system.

FIG. 8f depicts a rear view of the third alternative embodiment of the Christmas tree watering system of FIG. 8e.

FIG. 8i depicts a fifth alternative embodiment of a Christmas tree watering system in a first configuration.

FIG. 8j depicts a partial cut-away view of the fifth alternative embodiment of FIG. 8i in a second configuration.

DETAILED DESCRIPTION

Figure 1:
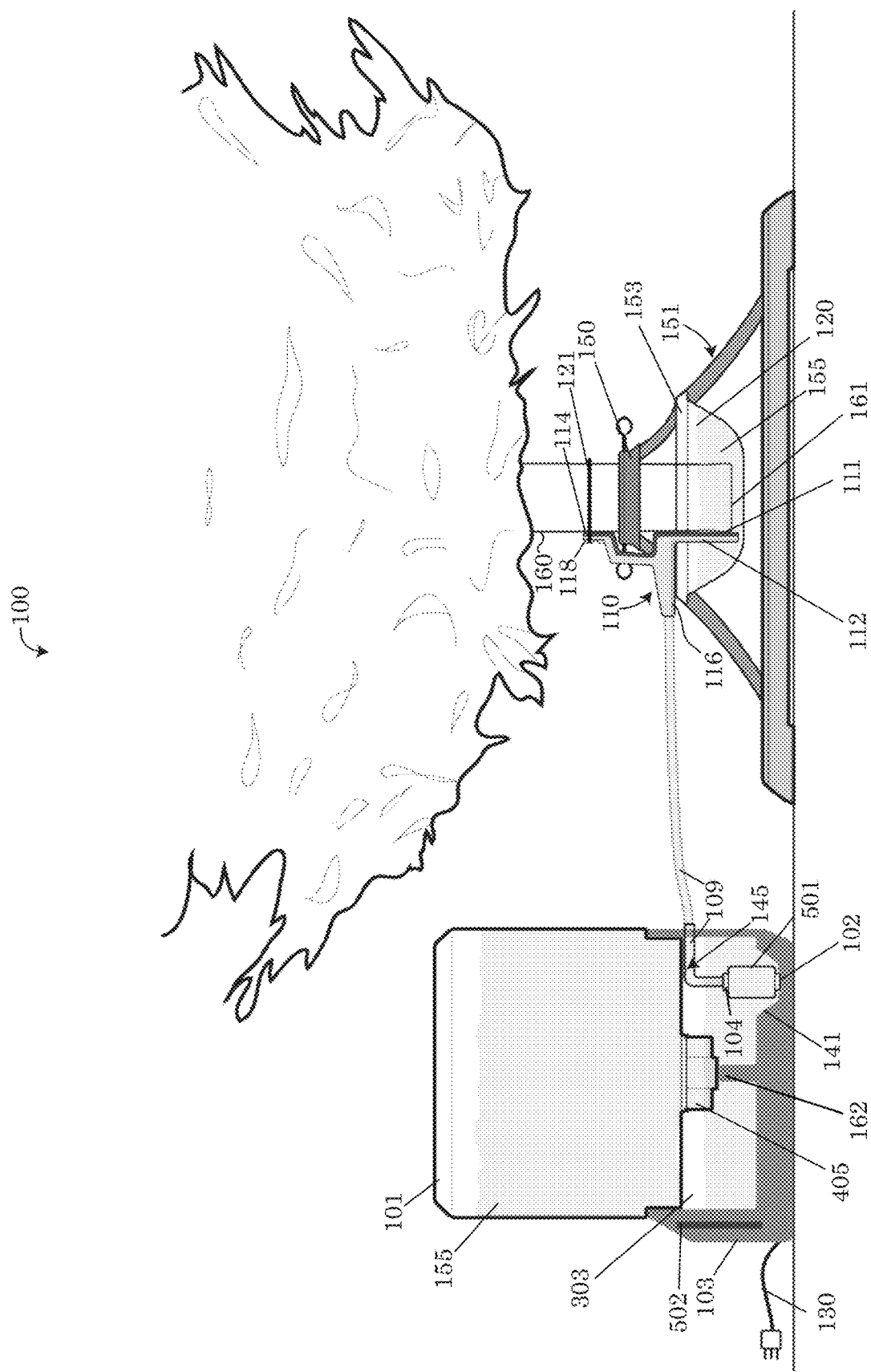
FIG. 1 depicts a partial cut-away view of an embodiment of an automated Christmas tree watering system delivering fluid to a Christmas tree stand.

A detailed description of the hereinafter described embodiments of the disclosed apparatus and method are presented herein by way of exemplification and not limitation with reference to the Figures. Although certain embodiments are shown and described in detail, it should be understood that various changes and modifications may be made without departing from the scope of the appended claims. The scope of the present disclosure will in no way be limited to the number of constituting components, the materials thereof, the shapes thereof, colors thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Overview

Embodiment of the present disclosure recognize that currently available watering systems for vegetation, including plants and trees are inefficient and incapable of consistently maintaining a fluid level automatically in a Christmas tree stand. Existing watering systems rely on mechanisms for measuring and maintaining moisture in soils instead of a fluid level. However, Christmas trees are no longer living or rooted vegetation and thus require a different degree of care than may be customary for plants or other vegetation potted in soil. In particular, Christmas trees reside within a fluid medium and not a soil medium. Existing methods and apparatuses for watering living vegetation described above are incapable of operating in fluid only mediums such as methods operating using capillary action and moisture sensing technology. Existing watering devices do not consistently measure fluid levels and refill the fluids automatically once the vegetation is in need thereof.

Embodiments of the present disclosure solve the problems incurred by currently available watering systems designed for potted plants and have introduced a new universal system for automatically filling and maintaining water levels within the reservoirs of any Christmas tree stand. The embodiments of the automated watering system disclosed herein recognize the increased difficulty of watering a Christmas tree and maintaining fluid levels over the relative ease of delivering fluid to a potted plant. Potted plants are generally easily accessible, have a wide mouth, similar shapes and less obstructions generally. Potted plants having a soil medium are much easier to stake a moisture sensor or hose into the soil, because the rigidity and compaction of the soil provides ample stability for holding sensors and fluid delivery mechanisms. Christmas trees and tree stands on the other hand, come in many different shapes and sizes. Tree stands have a plethora of various mechanisms for holding a Christmas tree in place, ranging from simplistic to overly complex. Tree stands and the tree stand mechanisms can be obtrusive and unwieldly to navigate around with a one size fits all fluid delivery system. In addition to the obtrusiveness and complexity of the tree stands, the Christmas trees themselves contain protruding branches which can interfere with mechanisms intending to transfer fluid to maintain the fluid level in the stand's reservoir. Moreover, the reservoir of tree stands are filled with fluid instead of soil, which does not provide stability for a delivery mechanism, overall making the design, delivery and maintenance of fluid far more difficult than systems intended for potted plants.

Embodiments of the present disclosure utilize an automated system comprising a plurality of sensors and a pump to deliver fluid from a refillable reservoir to a container holding a Christmas tree, such as a Christmas tree stand. Embodiments of the watering system may attach a specialized hardware device to the Christmas tree (hereinafter referred to as a "tree attachment device") that may be capable of controlling the flow, delivery and direction of the fluid being pumped from the of the tree watering system's reservoir to a fluid-holding container of the Christmas tree stand. The tree attachment device has overcome the obstacles presented by the various Christmas tree stands and may universally attach to any tree stand that may be available, even the most complex stand mechanisms, sizes and shapes that may be seen as obstructing the path to the Christmas tree may be maintained by the automated fluid delivery system of the present application.

Embodiment of the tree attachment device may be affixed and secured to the trunk of the Christmas tree. The tree attachment device may comprise a directional nozzle for delivering the fluid and a tilt sensor in some embodiments to ensure that the fluid is being delivered in the intended direction of the Christmas tree stand's fluid holding container, preventing a flood or miss-transfer of fluid. Embodiments of the tree attachment device may further track the levels of fluid within the Christmas tree stand using a plurality of sensors or a fluid detection device. As the fluid inside the Christmas tree stand becomes depleted below a predetermined or minimally acceptable level of the sensors or fluid detection device, the pump may be activated to deliver additional fluid to the Christmas tree stand from the reservoir via the nozzle of the tree attachment device. As the water level increases above a predetermined height, set by the sensors affixed to the tree attachment device, the pumping operations may be terminated until the refilling cycle is reinitiated.

Embodiments of the automated watering system may further simplify the detection of water levels inside the fluid reservoir and avoid unnecessary pumping or electrical operations of the fluid pump while the reservoir is empty. For example, the watering system may simplify and protect against unnecessary initiations of the pump while the reservoir is dry by monitoring the electrical load or voltage being used by the pump during operations. A computing system comprising a processor, memory device and an input/output (I/O) interface may be connected to the pump and monitor pumping operations being performed during the transfer of water or other fluid mediums. The computing system may track the electrical power, current or voltage being provided to the pump during water delivery operations compared with pumping operations being performed while the reservoir is empty (or nearly empty), and this pumping air. The computer system upon detecting the pump operating under a low electrical load consistent with pumping air, the computer system may cease pumping operations and may alert users of the need to refill the reservoir.

Alternatively, in other embodiments unnecessary pumping or electrical operations of the fluid pump may be avoided by tracking the fluid levels within the base of the automated watering system. For example, one or more sensor devices of fluid detection devices may be placed within the base unit at a height that may be considered the minimal amount of acceptable fluid, such as a predetermined level above the intake of the pump. Once the fluid drops below the level of the base unit's sensors or fluid detection device, the pump may be instructed not to initiate or may be unable to initiate pumping operations until fluid levels inside the base have been replenished. Activating the base sensors or fluid detection device may also instruct the automated watering system to transmit a low fluid alert or provide an audio and/or visual signal indicating a low level of fluid.

System for Automatically Watering a Christmas Tree

Referring to the drawings, FIG. 1 depicts an embodiment of an automated Christmas tree watering system 100 (hereinafter "watering system 100"). The automated watering system 100 may include a plurality of one or more components, described herein in detail. Embodiments of the watering system 100 may comprise a fluid reservoir 101. The fluid reservoir 101 may be constructed out of any rigid material capable of containing fluid 155 inside the interior of fluid reservoir 101. For example, the fluid reservoir 101 may be constructed of any known plastics, molded plastics, thermoplastic resins, polycarbonate, epoxy resins, phenolic resins, polyethylene, polypropylene, polyvinyl chloride, polyethylene terephthalate, low density polyethylene, high-density polyethylene, polystyrene, and polylactide.

Embodiments of the fluid reservoir 101 may be constructed or molded into any shape or size desired in order to achieve a desired fluid 155 carrying capacity for the watering system 100. For example, in some embodiments of the fluid reservoir 101, the fluid reservoir may be shaped to include a flat top surface 311. The presence of a flat top surface 311 may be beneficial for balancing the fluid reservoir 101 while filling the reservoir 101. The flat top surface 311 may provide stability and prevent the fluid reservoir from tipping over while separated from the base unit 103.

In some embodiments, the fluid reservoir 101 may include a handle 105 which may allow for easier gripping and carrying by a user of the watering system 100. The carrying handle 105 may allow a user to lift and separate the fluid reservoir 101 from a separable base unit 103 more easily. The carrying handle 105 may be integrated into the body of the fluid reservoir 101 in some embodiments. In alternative embodiments, the carrying handle 105 may be separately attached or affixed to the fluid reservoir 101 or may be protruding from the top or side surfaces of the fluid reservoir 101.

The fluid reservoir 101 may be affixed, interconnected or positioned on top of a base unit 103. Embodiments of the base unit 103 may include an interior cavity 303 capable of receiving a portion of the fluid reservoir 103 inside the interior cavity 303 of the base unit 103. As shown in FIGS. 3a and 3b, the base unit 103 may receive and interconnect with the fluid reservoir 101 forming the connected watering unit comprising a fluid reservoir 101 attached to the base unit 103 as shown in FIG. 3a. Likewise, the fluid reservoir 101 may separate from the base unit 103, for example, by applying an upward force as shown in FIG. 3b, lifting the fluid reservoir 101 away from the base unit 103 revealing a lower portion 309 of the fluid reservoir 101. In some embodiments the lower portion 309 may be concealed by the base unit 103 while the fluid reservoir 101 and the base unit 103 are combined together as shown in FIG. 3a. The interface between the upper portion and the lower portion 309 of the fluid reservoir 101 may include a lip 310 or rim which may contact a lip, rim or support 312 of the base unit 103. The support 312 of the base unit 103 may be positioned around the perimeter of the interior cavity 303. As the fluid reservoir 101 is reconnected to the base unit 103, the lip 310 may mate with the support 312 to form an interface between the fluid reservoir 101 and base unit 103, allowing for the base unit 103 to support the fluid reservoir on top of the base unit 103.

In some embodiments of the watering system 100, the lower portion 309 of the fluid reservoir 101 may include additional features for delivering water from the fluid reservoir to the interior cavity 303. For example, in some embodiments of the fluid reservoir 101, the lower portion 309 interlocking, interconnecting or inserting into the interior cavity 303 of the base unit 103 may further comprise a ramped surface 301, a spout 305 and a reservoir port 307. The ramped surface 301 may direct fluid contained by the fluid reservoir 101 toward the spout 305, allowing the fluid contained inside the fluid reservoir 101 to eject more easily out of the reservoir port 307. The ramped surface 301 may be any angle desired. As the water ejects from the fluid reservoir 101 via the reservoir port 307, the water may slide along the ramped surface 301 in the downward direction of the ramped surface 301, increasing the ability of the fluid reservoir 101 to maximize the amount of fluid that may be entirely removed from the fluid reservoir 101. Ultimately decreasing the void space or remnants of the fluid that may be unable to be ejected from the fluid reservoir due to the size or shape of the fluid reservoir's 101 container.

Figure 3C:
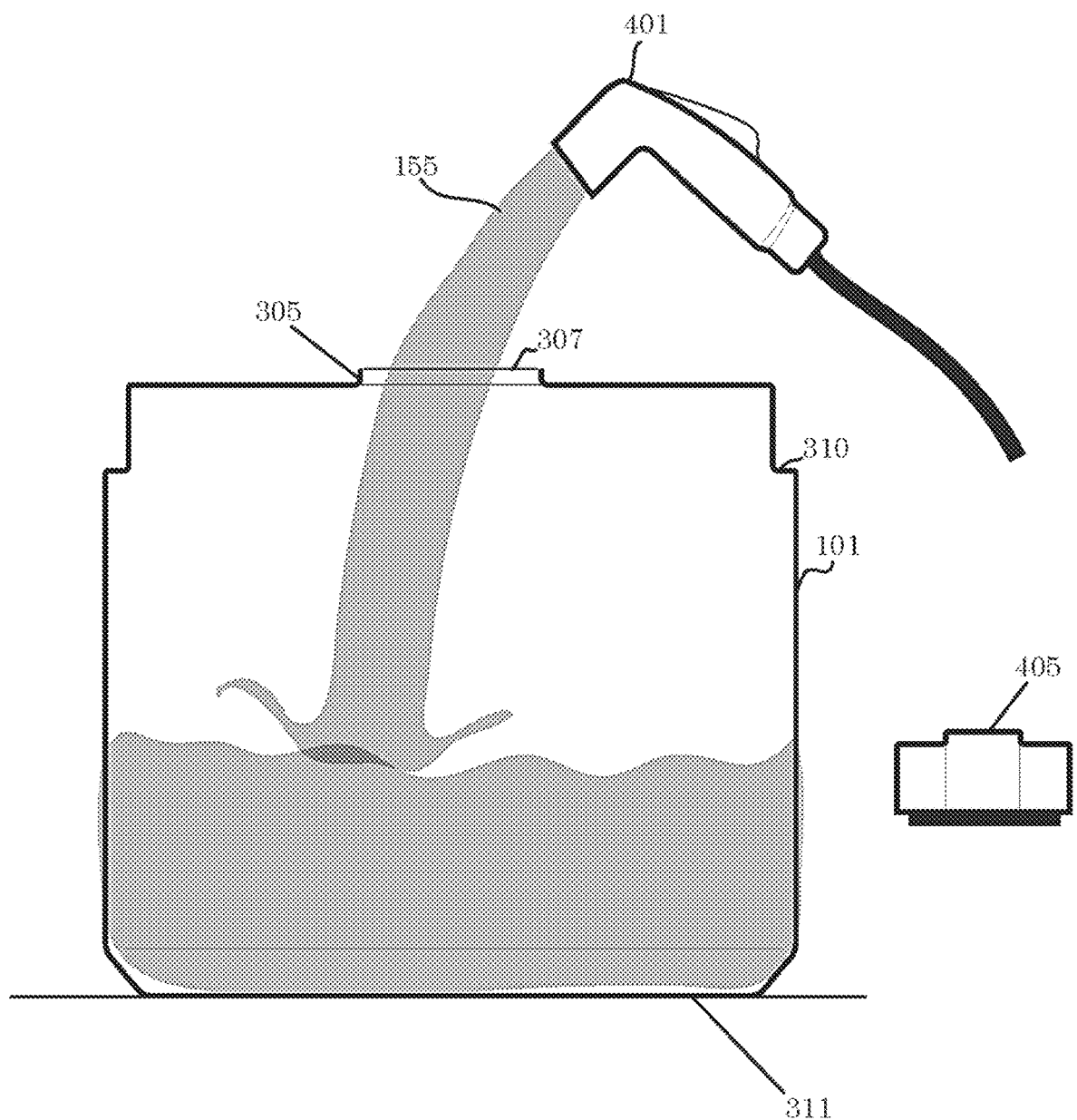
FIG. 3c depicts an embodiment of a method for filling a reservoir of an automated Christmas tree watering system.

Embodiments of the spout 305 of the fluid reservoir may operate in different in multiple configurations. In the first operating configuration, a dispensing mode, the spout 305 may be utilized during dispensation of the fluid 155 while the fluid reservoir 101 is connected to the base unit 103 as shown in FIG. 3a of the current application. The spout 305 may perform the action of guiding fluid 155 vertically downward, away from the fluid reservoir 101, toward the reservoir port 307 and into the interior cavity 303 of the base unit 103. Secondarily, the spout 305 may operate differently while the fluid reservoir 101 has been detached from the base unit 103 as shown in FIG. 3b. In the detached configuration, as shown in FIG. 3c, the fluid reservoir 101 may be configured for filling operation. Embodiments of the fluid reservoir may be designed to have a low profile height allowing the fluid reservoir 101 to easily fit within a standard sized sink.

During filling operations of the reservoir, fluid 155 may be introduced into the fluid reservoir 101 via a fluid source 401, such as a hose, tap, spigot, etc. The spout 305 may act as a guide for introducing the fluid 155 into the fluid reservoir 101 via the reservoir port 307, allowing the user to place the fluid source 401 through the reservoir port 307 and between the spout 305, allowing the fluid 155 to flow into the fluid reservoir 101 and fill the container of the fluid reservoir 101.

In some embodiments of the fluid reservoir 101, the spout 305 and the reservoir port 307 may be covered and secured using a cap 405 preventing the loss of fluid 155 during the transport of the fluid reservoir 101 while separated from the base unit 103. In some embodiments, the cap 405 may be a screw cap that may be fastened over the reservoir port 307 and threaded onto complimentary threads of the spout 305. In the exemplary embodiment, of the fluid reservoir 101, the cap 405 may be a spring cap that may securely fit over the reservoir port 307 or screw onto threads which may positioned along the spout 305 and the interior of the cap 405.

Embodiments of the fluid reservoir 101 comprising a spring cap may be sealed and air tight, preventing air from entering the fluid reservoir while the cap 405 has been securely tightened over the spout 305 and reservoir port 307. Embodiments of the spring cap may include various mechanisms for maintaining the air tight seal. For example, the spring cap may constructed to include a ball 220 and spring mechanism 222 or a valve system preventing air from entering the fluid reservoir 101 or fluid 155 from escaping the fluid reservoir 101 while either the fluid reservoir 101 is detached from the base unit 103 or the fluid level within the interior cavity 330 of the base unit 103 is above the exit port of the spring cap. In some alternative embodiments, the cap 405 may be a combination of a spring cap and a screw cap, that may allow for the removal of the cap 405 during filling operations to expose a wide mouth of the reservoir port 307 while preventing leaks or spillage when the combination cap is replaced after refilling and transporting the fluid reservoir 101.

Figure 2:
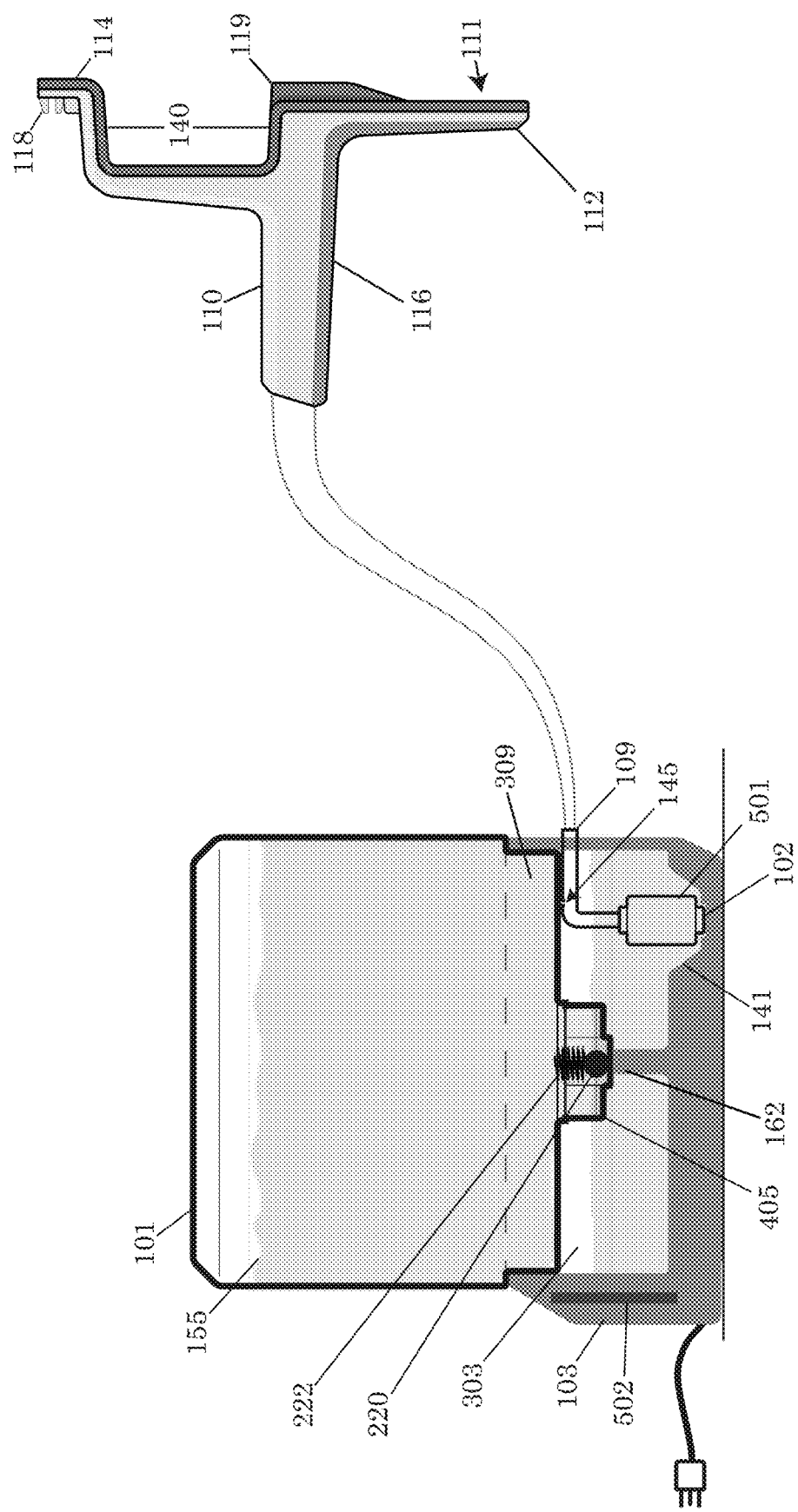
FIG. 2 depicts a partial cut-away side view of an embodiment of an automated Christmas tree watering system.

The cap 405 may control the release of fluid 155 from the fluid reservoir 101. Some embodiments of the base unit 103 may include a depression member 162. Upon reinserting the fluid reservoir 101 into the interior cavity 303 of the base unit 103, the depression member 162 may be biased against the cap 405. In an embodiment wherein the cap is a spring cap, the depression member 162 may compress a depression point of the cap 405, such as the ball 220 and spring 222 of the spring cap. Once depressed, the cap may intake air into the previously air tight and sealed fluid reservoir 101, breaking the vacuum seal of the air tight fluid reservoir 101, allowing air bubbles to flow into the fluid reservoir 101. The intake of air breaks the vacuum and releases a flow of fluid 155 held inside the fluid reservoir via the spout 307 through the exit of the cap 405 and into the interior cavity 303 of the base unit 103. The released fluid 155 may continue to fill a portion of the interior cavity 303 until the level of the fluid 155 inside the interior cavity reaches an equilibrium point with the fluid 155 released via the cap 405. The equilibrium point may coincide with the maximum fluid level inside the interior cavity 303 wherein the volume of fluid touches the output point of the cap 405 as shown in FIGS. 1-2. Accordingly, the position of the bleed port 145 may be positioned at a height above the output point of the cap 405, ensuring that the bleed port is not submerged by the fluid 155 filling the interior cavity 303.

As described below, the pump 501 may draw fluid from the interior cavity 303 via the pump's intake 102 or input. As the amount of fluid 155 is removed from the interior cavity 303 of the base unit 103, the fluid 155 may drop below the equilibrium point, causing air to re-enter the fluid reservoir 101 via the cap 405 causing the fluid reservoir 101 to once again controllably release fluid back into the interior cavity. Embodiments of the cap 405 may fashioned with various flow rates depending on the flow rate of the pump 501 exporting fluid from the interior cavity 303 to the tree stand 151 via the conduit 109. In some embodiments, the flow rate of the cap 405 may be greater than or equal to the flow rate of the pump 501. By matching or exceeding the flow rate of pump 501, the system 100 may ensure that the pump 501 can continuously pump the fluid 155 to the tree stand 151 without having to repeatedly stop pumping operations due to a lack of fluid in the interior cavity 303.

Figure 4A:
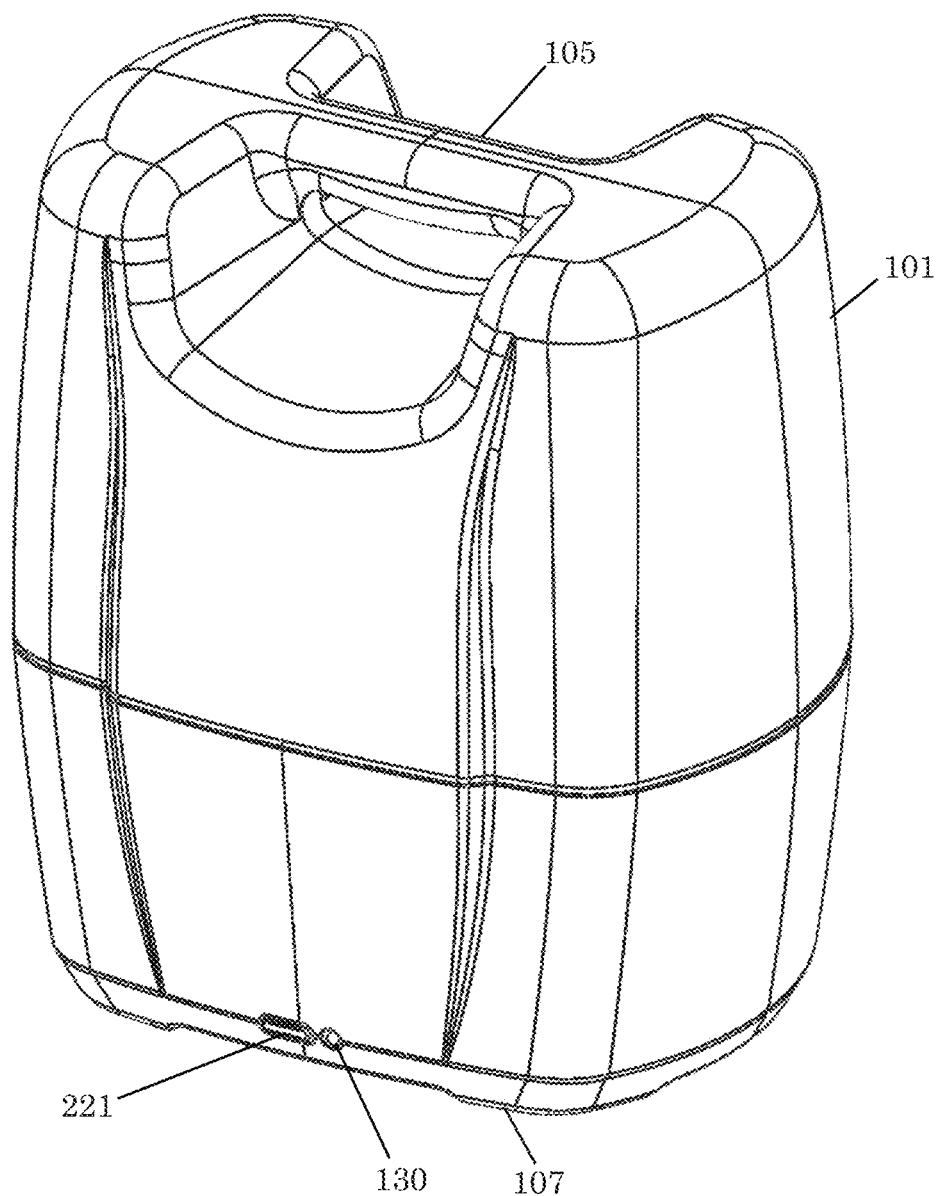
FIG. 4a depicts an isometric view of an embodiment of a reservoir and separable base of a Christmas tree watering system.
Figure 4B:
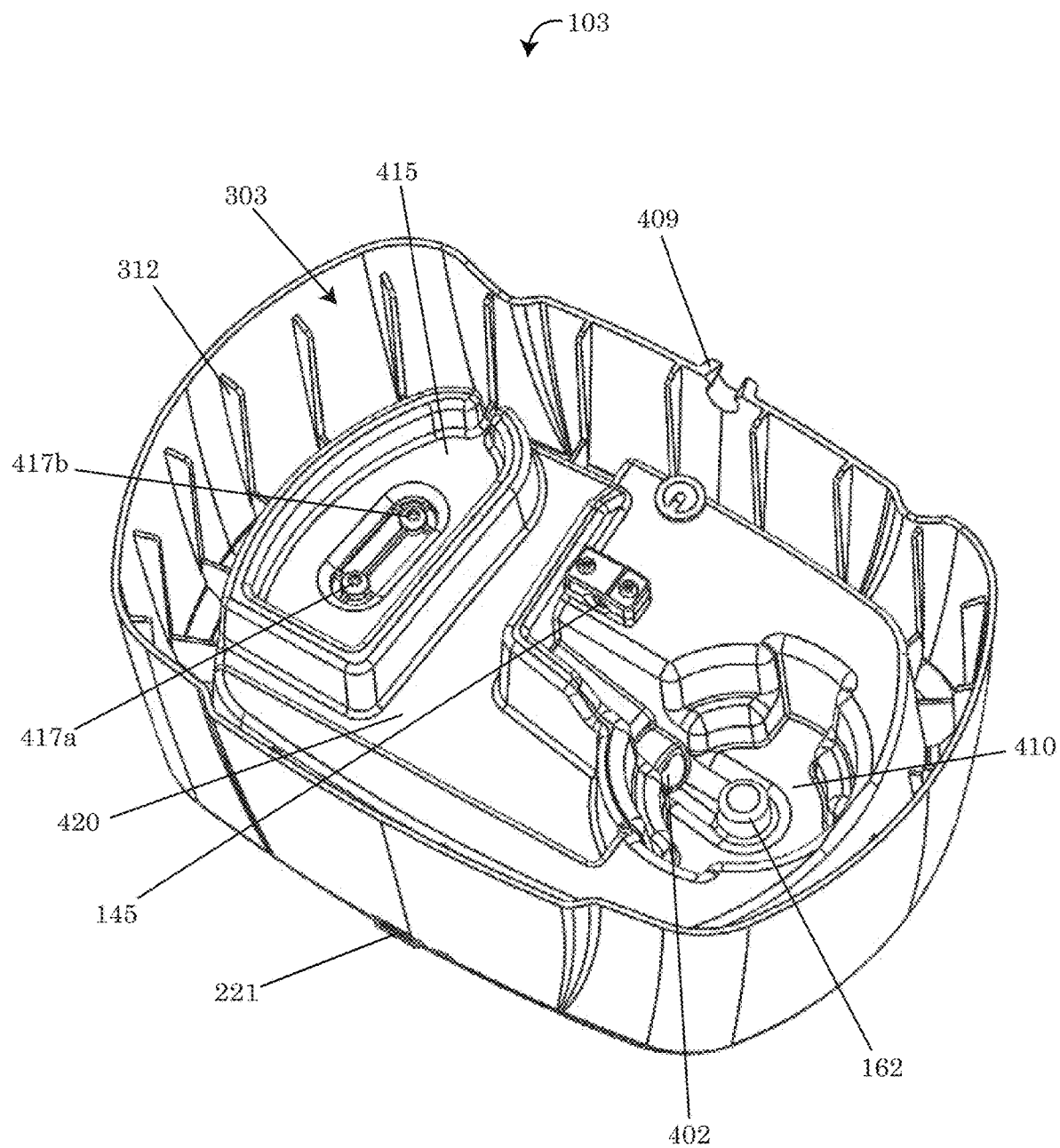
Figure 4C:
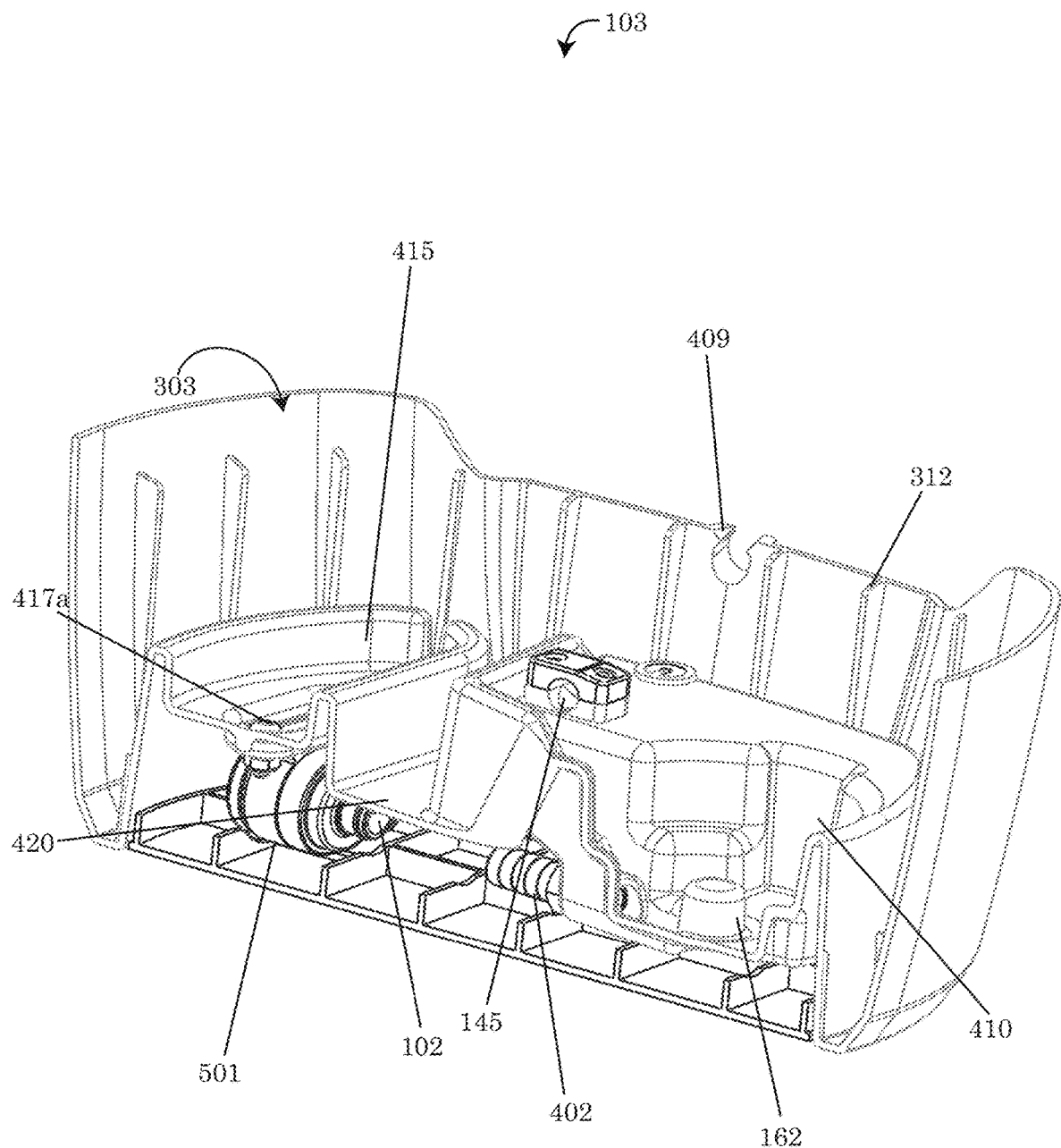
FIG. 4c depicts a partially cut away isometric view of the embodiment of the interior cavity of FIG. 4b.
Figure 4D:
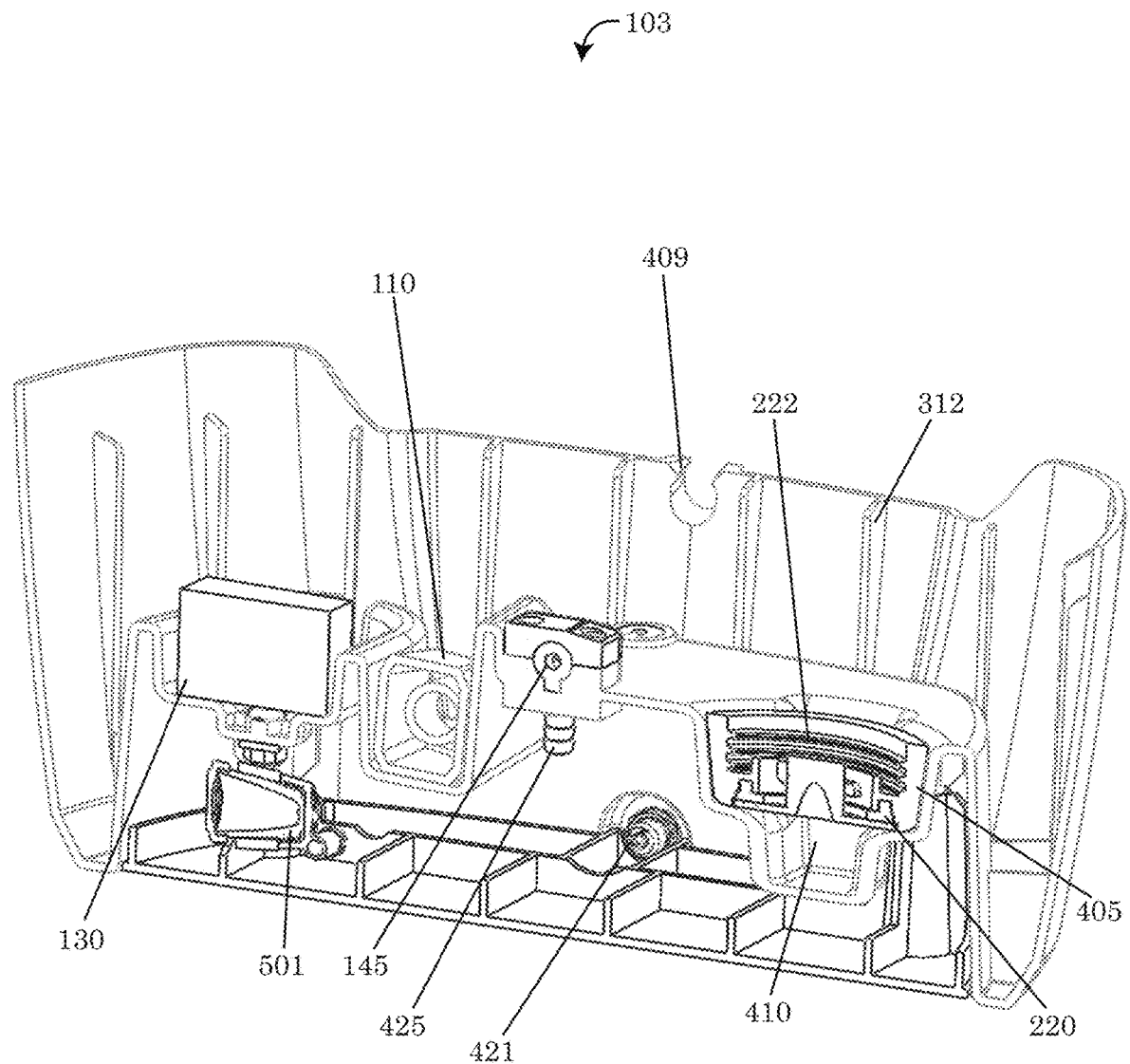
FIG. 4d depicts an alternative partially cut away isometric view of the embodiment of the interior cavity of FIG. 4b.
Figure 5:
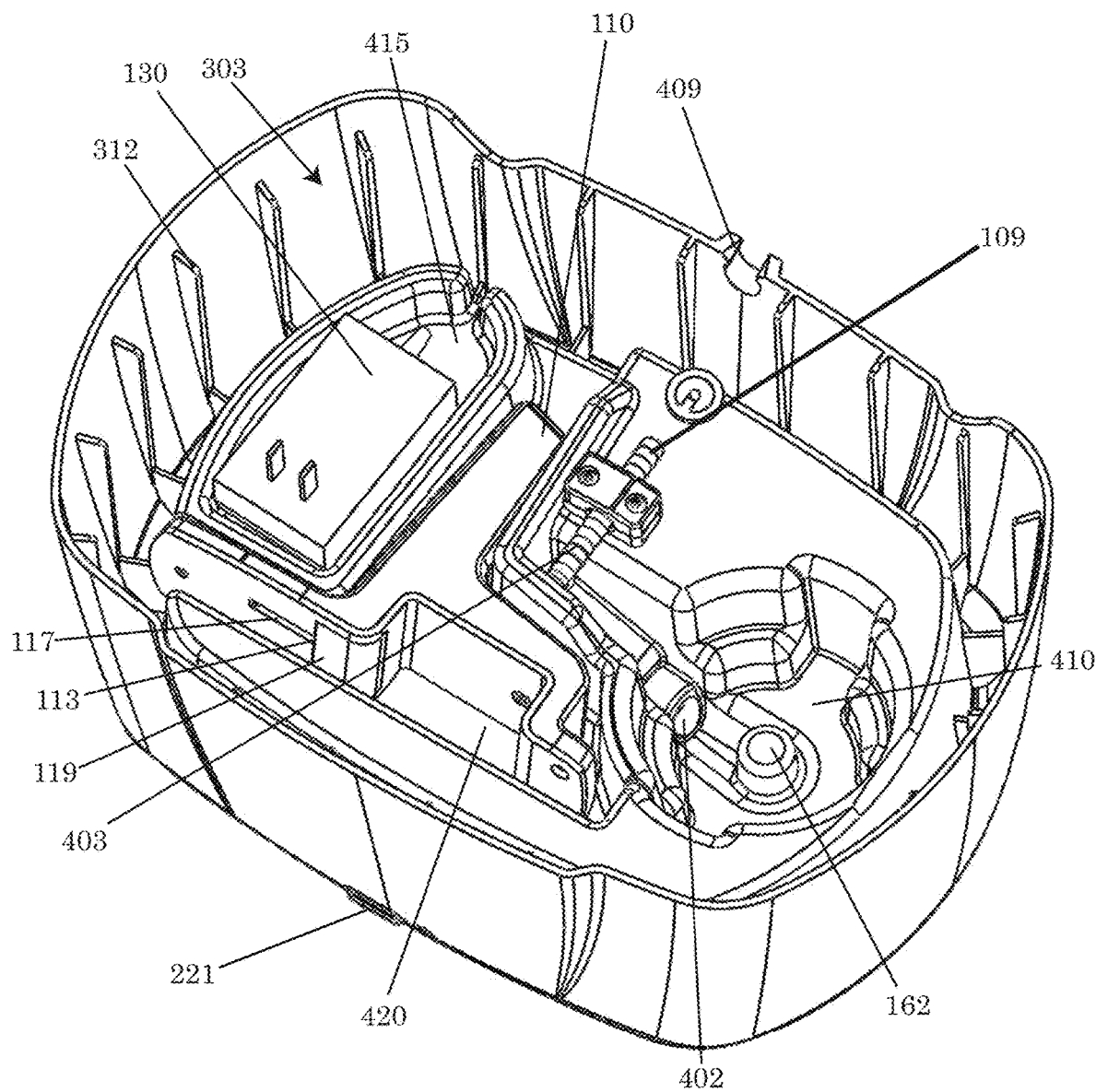
FIG. 5 depicts an embodiment of a base of an automated Christmas watering system in a storage configuration.
Figure 6C:
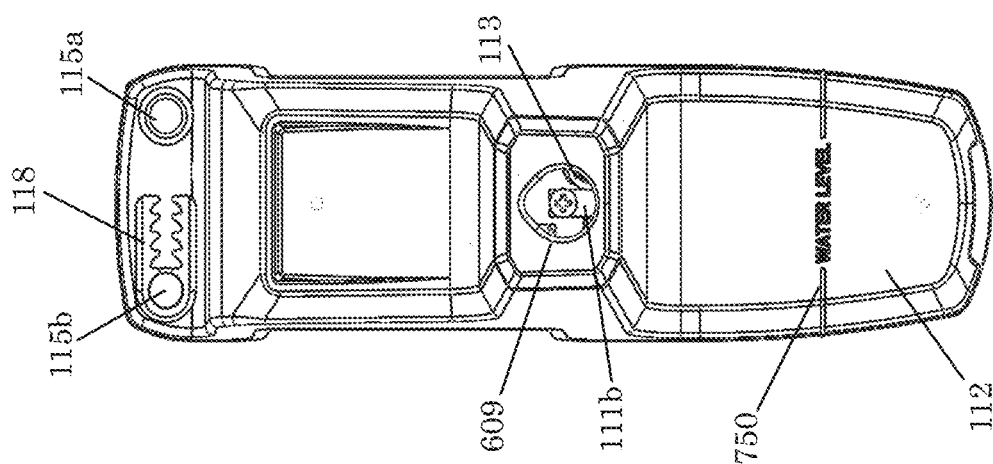
FIG. 6c depicts a rear view of an embodiment of a tree attachment device.
Figure 6B:
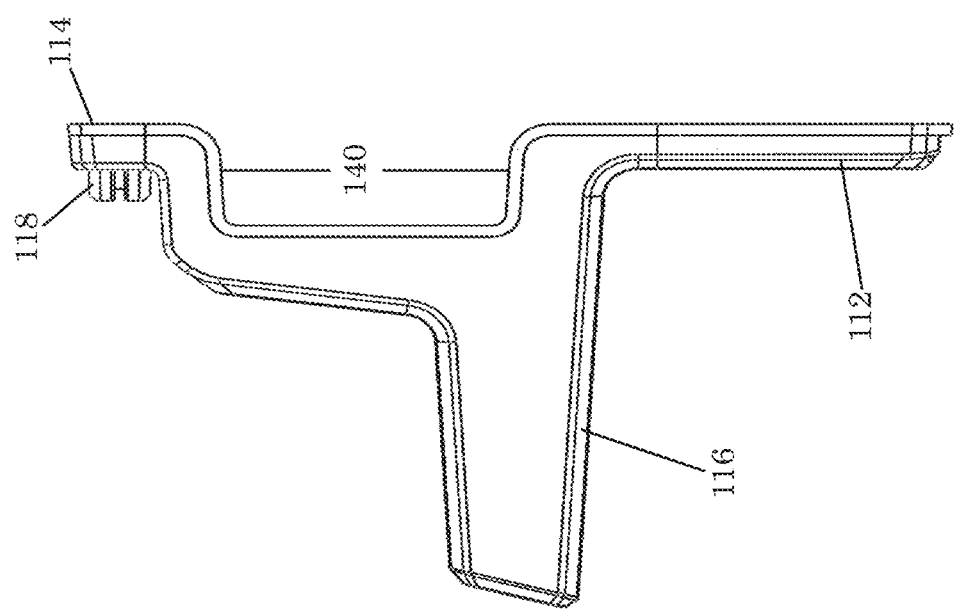
FIG. 6b depicts a side view of an embodiment of a tree attachment device.
Figure 6A:
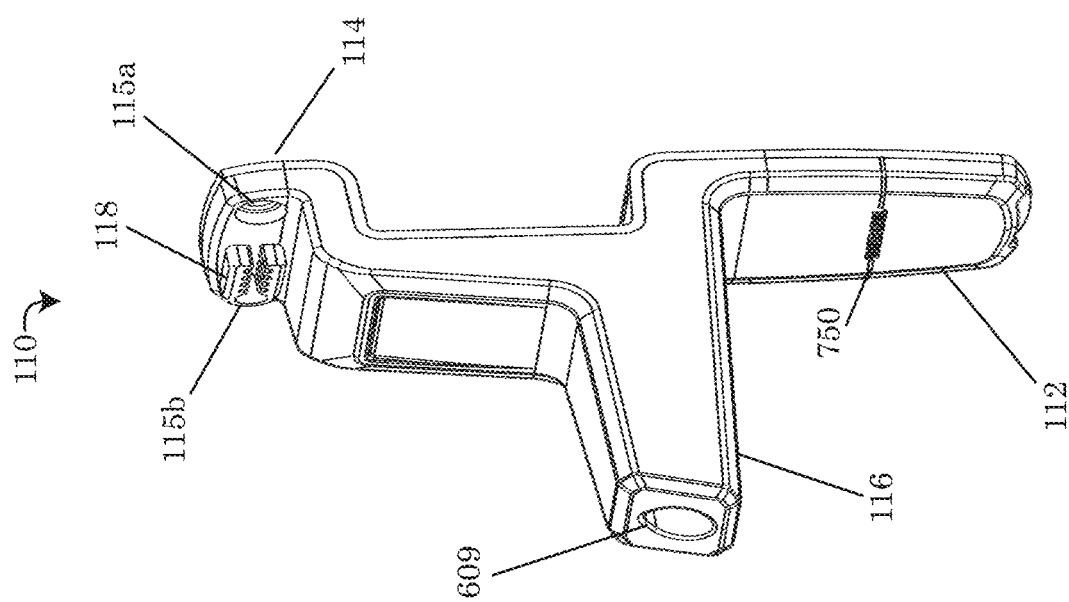
FIG. 6a depicts a rear isometric view of an embodiment of a tree attachment device.

Referring back to the drawings, FIGS. 4a to 5 provides a detailed example of an embodiment of a base unit 103 combined with an embodiment of the fluid reservoir 101. The base unit 103 may be constructed out of any rigid materials as described above, similar to the materials used to construct the fluid reservoir 101 described above. The exterior surface of the base unit 103 may be constructed to include one or more handles 105 or indentations, providing one or more graspable sections of the base unit 103 or fluid reservoir 101. Each of the handles may allow for users of the system 100 to more easily pick up and transport the base unit 103 and/or the combined base unit 103 with the attached fluid reservoir 101.

Embodiments of the base unit 103 may further comprise one or more feet 107 protruding from a bottom surface of the base unit 103. Each of the feet 107 may be positioned in a manner that may raise the bottom surface of the base unit 103 off of the ground. The feet 107 may vary in the number present, height and positioning. In the exemplary embodiment depicted by the drawings, there may be four feet 107 positioned approximately one foot 107 in each corner of the bottom surface of the base unit 103.

Embodiments of the base unit 103 may include additional features and components of the watering system 100 which may be positioned inside the interior cavity 303 of the base unit 103. For example, in some embodiments, the base unit 103 may house one or more mechanical or electrical components for pumping, measuring and distributing the fluid 155 from the reservoir 101 to a reservoir of a Christmas tree stand 151 or other fluid container and components for storing exterior components of the system 100. Components or features of the system 100 positioned within the base unit 103 may include a pump 501, a conduit 109 extending from an output of the pump 501 to the input of a nozzle 113 of the Christmas tree attachment device 110, a bleed port 145 positioned along conduit 109, a cap 405 receiving section 410, a depression member 162, a pump 501 intake conduit 402, one or more base unit level sensors 417a, 417b, a power source 130 storage section 415, a tree attachment device 110 storage section 420 and one or more specialized computer systems 502 further described herein, which may be tasked with controlling the pumping operations of pump 501.

Embodiments of pump 501 may be any type of pump capable of transferring fluid 155, such as water, from the fluid reservoir, through conduit 109 into the reservoir of the Christmas tree stand 151 or other receiving container. Suitable types of pumps may include centrifugal water pumps and positive displacement pumps. For example, the types of pumps 151 may include helio-axial pumps, twin screw pumps, progressive cavity pumps, electric submersible pumps, lobe pump, screw pump, impulse, or any other suitable type of pump that may be available for displacing and transferring the fluid 155 from the interior cavity 303 to a tree stand 151.

In some embodiments of the watering system 100, the pump 501 may include an intake 102 configured to withdraw the fluid from the interior cavity 303 of the base unit 103, supplied by the fluid reservoir 101 and an output 104 configured to discharge the pressurized fluid 155 being transferred from the pump 501 to the Christmas tree stand 151 or other receiving container. In some embodiments of the interior cavity 303, the intake 102 of the pump may be connected to an intake conduit 402. The intake conduit 402 may be any conduit, channel or passageway within the interior cavity which may lead the fluid 155 stored by the interior cavity 303 of the base unit 103 to the intake 102 of the pump 501. The conduit, channel, or passageway of the intake conduit may, in some embodiments comprise a downward sloping or ramped portion 141 guiding the fluid 155 toward the intake 102 using gravity, as shown in FIG. 1-2.

In some embodiments, the intake conduit 402 may receive fluid 155 from a cap 405 receiving section 410. As shown in FIGS. 4b-4d, the cap 405 receiving section 410 may receive the cap 405 of the fluid reservoir 101 once the fluid reservoir 101 is combined with the base unit 103. The receiving section 410 may be sized to fit the cap within the carved out section of the interior cavity and allow for the cap to be seated within the receiving section. In some embodiments of the system 100, the depression member 162 may be positioned in the bottom of the receiving section 410. As the cap 405 is positioned and held in place by the receiving section 410, the depression member may depress a depression point 220 and/or spring 222 of a spring cap, breaking the vacuum within the fluid reservoir 101, causing water to release from the cap 405 into the receiving section 410. As the fluid 155 flows from the cap 405 and fills the receiving section 410, the fluid may travel along the intake conduit 402 to the pump's intake 102. Excess fluid 155 flowing into the receiving section 410, beyond the volume of the receiving section 410, may overflow from the receiving section 410 into one or more remaining sections of the interior cavity 330. For example, fluid 155 may flow into carved out portions of the interior cavity 303 such as the power source 130 storage section 415 and the tree attachment storage section 420.

In some embodiments of the system 100, a section of the interior cavity 303 may comprise one or more sensor devices 417a, 417b or fluid level detection devices (hereinafter referred to generally as sensor devices 417a, 417b), for identifying a level of fluid 155 within the interior cavity 303. The sensor devices may act as a failsafe in order to ensure that the pump 501 is actually pumping fluid 155 present within the interior cavity 303 as opposed to air that may be present when the level of fluid 155 within the interior cavity 303 becomes depleted. In the example depicted in FIGS. 4b to 4d, the sensor devices 417a, 417b may be level sensors or contact sensors positioned within one of the storage sections 415, 420 of the interior cavity 303. As fluid overflows the cap 405 receiving section 410, the fluid may fill the remainder of the interior cavity 303, including the section comprising the sensors 417a, 417b (which are placed in the power source 130 storage section 415 in the exemplary embodiment). In some embodiments of the sensors 417a, 417b may be pins, screws, rods or other constructs made out of a conductive material. The sensors 417a, 417b may be attached to the pump's 501 electrical circuit. When the level of fluid is sufficiently supplied to the section wherein the level sensors 417a, 417b are positioned, electrical conductivity between the first sensor 417a and the second level 417b may be established, completing the pump's electrical circuit. Therefore, when the pump 501 receives a signal to initiate the pump's 501 circuit, the pump 501 is innervated with electrical energy and thus initiates due to the circuit being completed. Conversely, if the level of fluid does not fill the section of the interior cavity comprising the sensors 417a, 417b the conductive communication is broke and thus the circuit may be incomplete, preventing the pump 501 from initiating when requested to do so.

The height of the sensors 417a, 417b may be positioned in a manner such that the sensor(s)'s height may be considered the minimal level of fluid 155 which may be present in the interior cavity for the pump 501 to successfully initiate and distribute fluid 155 from the interior cavity 303 to the tree stand 151. The position of the level sensor's 417a, 417b may be any height, however in the exemplary embodiment, the level sensor's 417a, 417b may be positioned within the interior cavity 303 at a height above the pump intake 102 of the intake conduit 402, which may ensure that a residual amount of fluid 155 is present in the pump intake 102 or intake conduit 402 instead of air.

Embodiments of conduit 109 may be utilized to carry the fluid 155 being transferred from the fluid reservoir 101 to the Christmas tree stand 151 via the output 104 of pump 501. The pump 501, situated inside the interior cavity 303 may intake 102 the fluid 155 within the interior cavity 303 and expel the fluid through an output 104 of the pump into conduit 109 which may extend from the output 104 of the pump 501 to an input of the nozzle 113 located within the tree attachment device 110. Embodiments of the conduit 109 may be one cohesive single conduit 109 extending from the pump output 104 to the input of the nozzle 113. In alternative embodiments, the conduit 109 may be segmented into a plurality of connected conduits. For example, in the embodiment of FIG. 4d, the conduit 109 may comprise a first conduit extending from the output 104 of pump 501 to a conduit connector 421, wherein a second conduit may extend from the output of the conduit connector 421 to a T-shaped connector 425 comprising a vertical input a perpendicular output connected to a third conduit a bleed port 145.

Embodiments of the conduit 109 may be constructed out of a rigid or semi-rigid material. For example the conduit may be rigid or flexible plastic, metal or rubber piping or hoses. For example, the conduit may be constructed out of thermoset plastics, aluminum, PVC, stainless steel, silicone, woven fabrics, Teflon®, fiberglass, polyurethane, synthetic rubbers such as ethylene propylene diene monomer (EPDM) rubber, nitrile rubbers such as acrylonitrile butadiene rubber, and any other type of hosing or piping material that may be known by individuals skilled in the art.

Upon activating the pump 501, the fluid 155 contained in the fluid reservoir 101 may enter the input of pump 501 whereby the pump 501 pressurizes the fluid 155 and discharges said fluid 155 from the pump through conduit 109 toward the nozzle 113. As shown by in FIGS. 1-2, embodiments of the conduit 109 may exit the base unit 103 via a hole, port or notch 409 (hereinafter "port 409") boring through the base unit 103. The conduit 109 may pass from the interior cavity 303 through the port 409 in the base unit 103 and exit the base unit 103 in a direction toward the Christmas tree stand 151 or other container desired to be filled.

Embodiments of the base unit 103 may be further configured to comprise a power source 130. The power source 130 may be any known type of power source 130 capable of energizing the power consuming components of the watering system 100. The components consuming the power source 130 in order to operate may include, but is not necessarily limited to the pump 501 and the computer system 502 including one or more input or output devices of the computer system 502, such as the contact sensors 111 and the tilt sensor 701. Examples of suitable power sources may include AC or DC power supplies, including AC or DC adapters plugged into a wall outlet, AC or DC power transformers, switched mode power supplies, battery or rechargeable battery power supply or an uninterruptible power supply which may have an AC power supply and a battery backup power supply.

Embodiments of the watering system 100 may further include a tree attachment device 110 (also referred to as a Christmas tree attachment device). The tree attachment device 110 may perform a combination of tasks and include multiple components built into one or more different embodiments. The tree attachment device 110 may receive conduit 109 and secure the conduit 109 to the Christmas tree and/or stand 151, deliver and release the fluid 155 being pumped by pump 501, aim and align the flow of the fluid 155 in the direction of the Christmas tree stand 151 (or receiving container) and sense the amount of fluid 155 remaining within the Christmas tree stand 151 or container. Each of the tasks performed by the multifunctional tree attachment device 110 may vary depending on the components integrated into the tree attachment device 110 as described below.

Embodiments of the tree attachment device 110 may be constructed out of any rigid materials, including the materials that have been previously mentioned in this application. The shape of the tree attachment device 110 may be any particular shape that may stabilize the tree attachment device against a tree trunk 160; however, the exemplary shape of the tree attachment device 110 may be similar to the shapes and/or proportions depicted in the figures of this application. The shape as shown in the figures may not only incorporate each of the features described herein, but may offer additional unexpected stabilizing and positioning attributes.

In the exemplary embodiment, one of the external features of the tree attachment device 110 may include a horizontal member 116 receiving the conduit 109 via a horizontal member inlet 609. The horizontal member inlet 609 may be a hole or bore allowing the conduit 109 to pass through the horizontal member 116, wherein the horizontal member may act as a shield or housing to protect a portion of the conduit 109 passing there through and connecting to the input of the nozzle 113. The bore of the horizontal member inlet 609 passing through the horizontal member 116 may also act as a guide for connecting the conduit 109 transporting the fluid 155 to the input of the nozzle 113. Furthermore, the casing of the horizontal member 116 may shield the conduit 109 from becoming damaged and provide strain relief for the conduit 109 by reducing the tension or torsion that may be placed on the conduit 109 and prevent twisting of the conduit 109. Embodiments of the horizontal member 116 may be positioned perpendicular (or nearly perpendicular) to a rim 153 of a bowl or reservoir of the Christmas tree stand 151 defining the maximum fluid level that may be held by the reservoir of the tree stand 151. Embodiments of the horizontal member 116 may provide a surface for the tree attachment 110 to rest on the rim 153 of the Christmas tree stand 151, assisting with maintaining the tree attachment 110 in an upright position and directing the nozzle 113 over the bowl or reservoir of the Christmas tree stand 151.

In some embodiments of the tree attachment device 110, a vertical member 112 may be connected to the horizontal member 112 and extend downward from the underside of the horizontal member 116. The vertical member 112 may extend parallel or nearly parallel to the trunk 160 of the Christmas tree and/or one or more sidewalls of the reservoir of the Christmas tree stand 151. Embodiments of the vertical member 112, may comprise and provide a housing for one or more additional features. For example, in some embodiments, the vertical member 112 may include a channel 117 or groove which may be formed as part of the vertical member 112. The channel may be formed below the output of the nozzle 113. The channel 117 may be cut into the material of vertical member 112 and may further guide and direct the flow of fluid released from the nozzle 113 downward in a directed manner toward the interior bowl or reservoir of the Christmas tree stand 151.

In other embodiments of the tree attachment device 110, the vertical member 112 may include a shield 119 forming a partial or full covering over the exterior surface of the nozzle 113, protruding from the vertical member 112. The shield 119 may direct the flow of fluid toward the channel 117 and may prevent unintended splashing or spraying of the fluid from the nozzle in unintended directions. Embodiments of the shield 119 may also protect the nozzle 113 from impacts that may bend, break or disturb the flow of the fluid out of the nozzle. In alternative embodiments such as the embodiment of FIG. 8, neither the shield 119 and/or the channel 117 may be present on the vertical member 112.

In some embodiments of the tree attachment device 110, the vertical member 112 may extend from the rim 153 into the reservoir of the tree stand 151 where the fluid 155 may be transferred to via the conduit 109 and out of the nozzle 113. The design and positioning of the tree attachment device 110 may ensure that the fluid does not rise above the rim 153 of the tree stand 151. In some embodiments, the vertical member may be marked on the exterior surface of the vertical member 112 with a water level indicator 750. As shown in FIG. 1, the horizontal member may rest on the tree securing device 150 or rim 153 of the tree stand 151, positioning the horizontal member 116 above the rim 153 defining the maximum fluid level of the tree stand 151 and the vertical member 112 may extend into the tree stand's bowl or reservoir. A plurality of sensors or fluid detection devices, such as one or more contact sensors 111a, 111b, 111c (collectively referred to as "sensors 111") may be positioned at various lengths along the vertical member 112 as shown in FIG. 7b. The sensing portion at the bottom of the contact sensors 111 may be placed at almost any position along the vertical member 112 between the bottom of the vertical member 112 and below the output of the nozzle 113.

The term "sensor" may refer to a device that detects or measures a physical property." For example, the sensor may be any device that may be capable of detecting a level of fluid. In some embodiments, the sensors 111 may be referred to as a "sensor system" which may comprise one or more components, including one or more sensor devices which may detect fluid levels, a computer system 502 and one or more circuits for transmitting, and receiving signals between the sensor devices and the remaining components of the system 100 (including the computer system 502 and the pump 501).

One important consideration when affixing a sensor 111 to the vertical member 112 may be to maintain a length of the lowest sensor 111b that is submerged within the fluid 155 to a depth of the tree stand's 151 reservoir that is higher than the lowest point of the tree trunk 160. By maintaining the sensors 111 above the lowest point of the tree trunk 160, the system 100 may ensure that fluid levels 120 in the tree stand 151 do not fall below the bottom 161 of the trunk 160 and thus do not risk drying out the Christmas tree or sealing the bottom surface of the trunk with air. This is an important feature because the introduction of air molecules to the bottom surface of the trunk 160 may inhibit the ability of the tree to uptake water and move through the trunk and into the stems and foliage. The introduction of air molecules can make the tree more susceptible to drying out which could become a potential fire hazard. The sensors 111 being maintained at a depth above the exposed bottom surface 161 of the tree trunk 160 mitigates the introduction of air into the bottom surface 161 of the tree trunk 160.

Moreover, in some embodiments the ratio of the length of sensors 111 and the position of the sensors 111 housed within the vertical member 112 of the tree attachment device 110 relative to the fluid level 120 of the tree stand, the bottom of the tree trunk 160, the tree securing device 150 and/or the rim 153 may be important for successfully watering the Christmas tree. The tree attachment device 110 may universally be utilized with any type of tree stand 151 because of the positions of the horizontal member 116 and the contact sensors. For example, when utilizing three sensors 111a, 111b, 111c, the sensors 111 may each be positioned at various lengths along the vertical member 112 between the output of the nozzle and above the bottom surface of the tree trunk 160. For example, in the exemplary embodiment, a first sensor 111c may be of a length configured to reside at a depth higher than the bottom of the tree trunk 160. A second sensor 111a may be a sufficient length such that the second sensor 111a is positioned below the rim 153 defining the maximum fluid level of the tree stand and a third sensor 111b that may be shorter in length than the first sensor 111c and longer in length than the second sensor 111a. Embodiments of the horizontal member 116 resting on either the rim 153 or tree securing mechanism 150 may prevent any of the contact sensors 111 from being positioned above the rim 153 and thus the contact sensors may not be positioned above the maximum fluid level of the tree stand. Likewise, the vertical member 112 submerged into the reservoir of the tree stand may leave a large enough gap of material between the bottom of the vertical member and the sensor 111 closest to the bottom of the tree trunk, such that the sensor could not touch the bottom surface of the bowl or reservoir of the tree stand and thus be unable to extend below the bottom surface of the tree trunk 160 (unless a user negligently secures the tree at a height above the bottom of the tree stand's reservoir).

Furthermore, the potential tilting or change in alignment of the tree attachment device 110 during fluid transfer operations may be considered during the placement of the contact sensors 111 on the vertical member 112. While placing the contact sensors 111 too low on the vertical member 112, may risk allowing the fluid level 120 to fall underneath the lowest point of the tree trunk 160, placing the contact sensors 111 to close to the nozzle 113 may also risk improper operation of the system 100. For example, during operation of the system 100, the tree attachment device 110 may tilt up to an allotted angle (i.e. up to 15 degrees) from a y-axis established by the tilt sensor 701. If, the contact sensors 111 are placed too close to the nozzle, there may be a risk that upon tilting the tree attachment device 110, sensors 111a, 111b and/or 111c may be positioned improperly above the intended fluid level or above the rim 153. Should the tilting of the attachment device 110 misalign the sensors 111 above the rim, the pump 501 may operate improperly and pump fluid 155 continuously.

In addition to properly positioning the contact sensors 111, an additional safety mechanism to avoid unintentional over-pumping of fluid may be the positioning of the horizontal member 116 in relationship to the contact sensors of the vertical member 112. Since the vertical member 112 extends downward from the bottom surface of the horizontal member 116 and the horizontal member 116 is positioned approximately on the rim 151 of the tree stand's reservoir, the fluid 112 cannot be filled higher than the rim 151 of the tree stand due to the positioning of the nozzle 113 and the positioning of the sensors 111 below the nozzle 113. Each of the sensors 111 may be positioned at a height that is lower than the rim 153 and may be positioned to not rise above the rim 153 even upon tilting the vertical member 112 up to an allotted angle of approximately 15 degrees.

In the exemplary embodiment shown, the plurality of contact sensors 111a, 111b, 111c may be positioned along the vertical member 112 and exposed to the fluid 155 maintained within the tree stand 151. The sensors 111 may be positioned within the interior of the tree attachment device 110, with a portion of the sensors 111 exposed to the fluid 155 via a cutout in the vertical member 112. The sensors 111 may be used to detect the fluid level 120 of the fluid 155 maintained inside the tree stand 151. Moreover, the height of the fluid sensors may dictate the maximum height of the fluid level 120 because the sensors 111 may identify and dictate the height of the fluid level and signal to the computer system 502 whether or not the pump 151 should be activated to increase the fluid level 120.

In some embodiments, the sensors 111 of the sensor system may be positioned proximate to second end of the conduit 109, the outlet of the conduit 109, the nozzle 113 or the output of the nozzle 113. For example, the sensors 111 of the sensor system may be connected to or adjacent to the portion of the system carrying or dispelling the fluid into the Christmas tree stand 151. In the exemplary embodiment, the sensors 111 of the sensor system may be positioned proximate to, but below the outlet of nozzle 113 or the second end of the conduit 109 outputting the fluid 155. By placing each of the sensors 111 below the output of the nozzle 113 or second end of the conduit 109, a siphon break may be created by the output of the nozzle 113 or second end of conduit 109 being exposed to air and thus acting as a second bleed port, interrupting a siphon that may be created during the pumping of the fluid 155 in addition to the siphon break which may be installed in the conduit 109 by adding the bleed port 145 to the conduit 109.

Embodiments of the siphon break may be created by placing a hole acting as a bleed port 145 in the conduit 109 at any point of the conduit 109 above the position of the pump 501 and above the fluid level of the interior cavity 303 of base unit 103. In the exemplary embodiment, the bleed port 145 may be positioned above the maximum height that the water level of the base unit 103 may achieve, for example, above the output of the cap 405. Embodiments of the bleed port 145 may positioned in a manner that allows for the siphon break to be achieved by emitting an amount of fluid from the conduit 109 via the bleed port 145 back into the base unit 103 as fluid is pumped through the conduit 109 toward the attachment device 110. The size of the bleed port 145 and thus the flow (Q) of the fluid from the bleed port 145 may be determined based on the flow rates of the system 100 to the tree ($Q_{tree}$) and the flow rate of the pump ($Q_{pump}$) wherein $Q_{tree}=Q_{pump}-Q_{bleed\ port}$. In the exemplary embodiment, the back flow of the bleed port may be less than 50% of the flow of the pump 501.

Embodiments of the present invention may include a first siphon break at bleed port 145 and a second siphon break at the outlet of nozzle 113. The system 100 of the present disclosure may use the two separate siphon breaks in order to prevent either forward siphon from emptying the fluid contents of the base unit 103 or a reverse siphon of the fluid contents of the tree stand 151's reservoir. Accordingly, by preventing both a forward or reverse siphon, each of the containers holding fluid in the system 100 may be independently positioned at various heights relative to one another. A user of the system 100 does not need to worry that the relative positions or heights of the base unit 103 and the fluid in the tree stand because if either one is above or below the height of the other, each siphon break will prevent the formation of the siphon from occurring, thus preventing users of the system 100 from inadvertently flooding the tree stand 151 or depriving the tree of fluid.

Each of the sensors 111 may be part of a circuit used for detecting the fluid level 120. The circuit may be completed when the fluid 155 comes into contact with the contact sensors 111 at the designated height of the contact sensor 111 exposed to the fluid 155 via a cutout or port in the vertical member 112. The plurality of sensors 111a, 111b, 111c may be positioned at various heights along the vertical member 112. The highest contact sensor 111a may act as the filling line for the fluid level to reach during filling operations. For example, once the fluid level 120 is too low and the fluid no longer makes contact with any of the contact sensors 111, the pump 501 may be initialized by computer system 502. The pump 501 may continuously pump fluid 155 from the fluid reservoir 101 into the Christmas tree stand 151 until sensors 111a, 111b, and 111c each make contact with the fluid 155 (completing the circuit), In some embodiments, there may be a decreased level of voltage being used by the pump 501 (consistent with pumping air) or a pre-programmed amount of time of time has passed after the initiation of the pump 501. The decreased voltage or time limit may act as a fail-safe in case there is an error in the delivery of the fluid 155 to the tree stand 151. Once the fluid level 120 has depleted below contact sensors 111b and 111c, the filling cycle may be performed again.

Embodiments of the sensors 111 are not limited to contact sensors as described above. Any type of fluid sensing sensor may be used to detect the levels of fluid in the tree stand's 151 reservoir. Examples of alternative types of sensors 111 that may be used may include, but are not limited to, wired or wireless sensors such as liquid level sensors, float sensors, capacitance sensors, conductivity probes, ultrasonic sensors, radar level sensors and optical sensors, laser measuring devices.

Embodiments of the conduit 109 may enclose and cover multiple separate conduits travelling from the base unit 103 to the tree attachment device 110. In some embodiments, the conduit 109 may conceal a separate fluid conduit 711 and an electrical conduit 709. The fluid conduit 711 may be responsible for transporting the fluid 155 from the output of the pump 501 to the input of the nozzle 113. The electrical conduit 709 may provide electrical power from the power source 130 to a computer system 502 which may be housed, in some embodiments within the tree attachment device 110. In alternative embodiments, the computer system 502 may be connected and stored within the base unit 103, as shown in FIG. 1 of this application. In some embodiments, the electrical conduit 709 may connect the computer system 502 housed within the base unit 103 with a separate circuit board housed within the tree attachment device. Communication between the computer system 502 and the components connected to the separate circuit board by performed using the electrical conduit 709 by inserting the electrical connector 710a of the electrical conduit 709 into an electrical receiver 710b of the circuit board. By establishing the connection between the power source 130 and the computer system 502 and/or separate printed circuit board, a voltage and electronic signals may be provided between each of the components, including the circuit(s) comprising each of the sensors 111.

Some embodiments of the tree attachment device may include a tilt sensor 701 which may communicate with the computer system 502. The tilt sensor 701 may be provided in the tree attachment device 110 to ensure the proper alignment and orientation of the tree attachment device 110 and the nozzle 113 prior to engaging the pump 501 and delivering fluid 155 to the tree stand 151. The tilt sensor 701 may establish an upright axis parallel to the tree trunk 160 of a Christmas tree, while the tree attachment device 110 is attached to the Christmas tree or tree stand 151. In the event that the tree attachment device slips, changes position or misaligns the upright axis, a signal may be sent to the computer system 502 preventing the computer system 502 from engaging the pump 501. By including a tilt sensor 701 in the tree attachment device 110, the system 100 may be prevented from pumping fluid 155 from the fluid reservoir 101 while the nozzle 113 is directed away from the reservoir of the tree stand 151. Ultimately preventing a misfire of the fluid 155 in a manner that may not be received by the tree stand 151, which could create a mess.

The upper portion of the tree attachment device 110 may be designed to include components for positioning and tightly securing the tree attachment device 110 to the trunk 160 of the Christmas tree. Moreover, the upper portion of the tree attachment device may also secure and maintain a substantially upright axis established by the tilt sensor 701 to prevent misalignment of the nozzle 113 delivering the fluid 155. In some embodiments of the tree attachment device 110, the tree attachment device 110 may include a frontward facing brace 114 which may be positioned up against the tree trunk 160 while attaching the tree attachment. The brace 114 may provide a flat or rounded surface for supporting the tree attachment 110 against the tree trunk 160 and may additionally provide a small gap between the tree trunk 160 and the nozzle 113. The gap may be achieved by having the brace 114 extending further forward than the vertical member 112 at the lower portion of the tree attachment device 110.

In some embodiments of the tree attachment device 110, an attachment mechanism 121 may be integrated into the tree attachment device 110 for securely affixing and tightening the tree attachment device 110 to the trunk 160 of the Christmas tree and/or Christmas tree stand 151. Embodiments of the attachment mechanism may include a cord sized to be threaded through a first bore 115a and a second bore 115b of the upper portion of the tree attachment device 110. The cord or other attachment mechanism 121 may be constructed out of a tight fitting, elastomeric material such as bungee cord or shock cord. The attachment mechanism may be threaded through the first bore 115a, wrapped around the tree trunk 160 and threaded through the second bore 115b. In some embodiments, the attachment mechanism 121 may be pulled tight until the brace 114 is snuggly positioned against the trunk 160 of the tree. The attachment mechanism 121 may securely tied off or knotted to ensure that the attachment mechanism 121 does not slip back through bore 115a. In the exemplary embodiment of the tree attachment device 110, a series of serrated teeth 118 may be integrated into the tree attachment device 110 adjacent to the bores 115a, 115b. As the attachment mechanism 121 is threaded through the second bore 115b, the cord 121 may be pulled and tightened as the attachment mechanism 121 is passed through the serrated teeth 118, notching the attachment mechanism 121 tightly until the brace 114 is affixed snugly against the trunk of the tree, in an upright manner consistent with an upright axis or axis aligned by the tilt sensor 701.

In some embodiments of the tree attachment device 110, the tree attachment device may include a U-shaped or C-shaped channel 140 between the upper portion of the tree attachment device near the brace 114 and the upper surface of the horizontal member 116. The channel 140 may be useful for allowing the tree attachment device 110 to accommodate many different types of tree stands 151 and containers. As shown in FIG. 1, some tree stands 151 may have a tree securing device 150 that may surround the circumference of the tree trunk 160 and hold the tree upright. The inclusion of the securing device 150 might otherwise prevent the tree attachment device 110 from biasing the brace 114 tightly against the trunk. The inclusion of a channel 140 in the design of the tree attachment device 110 may otherwise avoid the protruding securing device 150 of the tree stand 151 by aligning the tree attachment device in a manner that places the securing device 150 within the channel 140, allowing for both the brace 114 and/or the vertical member 112 to closely arrange themselves against the tree's trunk 160.

Figure 8H:
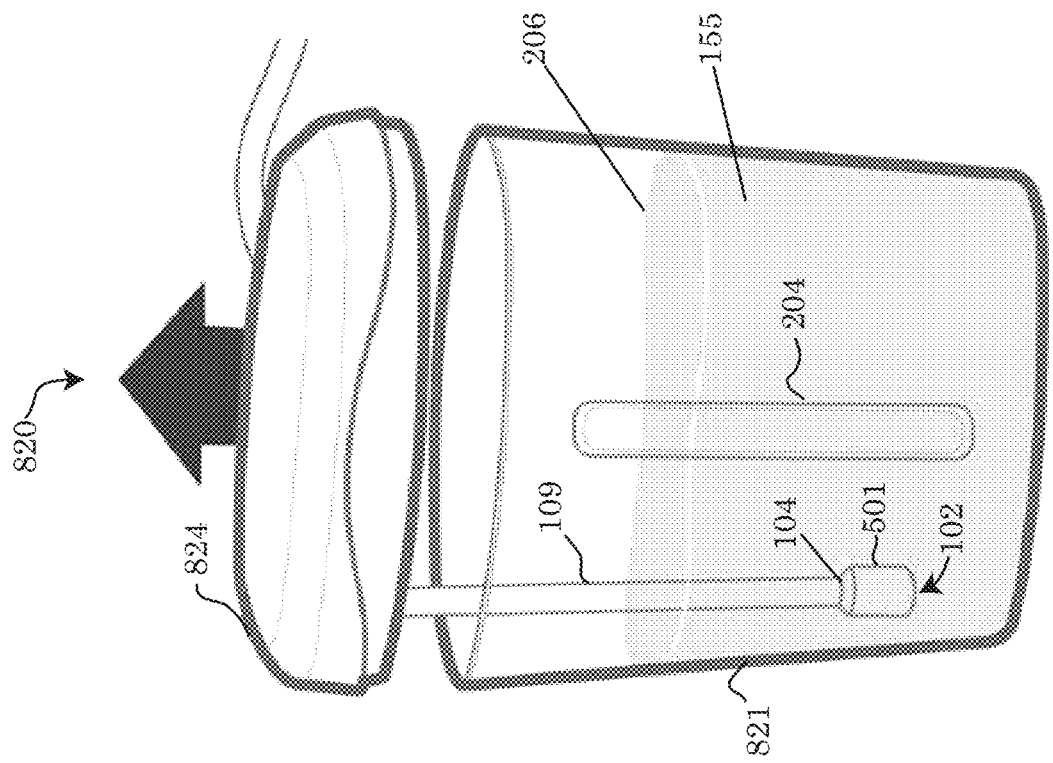
FIG. 8h depicts a partial cut-away view of the fourth alternative embodiment of FIG. 8g in a second configuration.

Referring now to FIGS. 8a-8j, embodiments of the tree watering system 100 may take on different designs and variations from the exemplary embodiments described above. FIGS. 8a-8j further depict examples of the various designs, alternative setups and arrangements of components of system 100 described above. FIGS. 8a-8b depict an alternative embodiment 800 of the watering system 100. The embodiment of system 800 depicts a watering system having a combined base unit 801 housing both the components of base unit 103, including the pump 501, conduit 109 and computer system 502 while further acting as the fluid reservoir 101. Instead of removing and filling a separable fluid reservoir 101 as shown in the embodiment of system 100, this alternative embodiment may include a removable or rotating cover 804 that may open and close, providing access to the interior cavity of the combined base unit 801. As shown in FIG. 8b, the cover 804 may change positions to reveal access to the interior cavity of the combined base unit 801 allowing for a fluid source 401 to be provided to the interior cavity of the combined base unit 801.

FIGS. 8c-8d provide an example of an another alternative embodiment of the system 100 of FIG. 1. Similar to system 100 shown in FIGS. 1-3c, the system may comprise the separable fluid reservoir 101 and base unit 103. As shown in the FIG. 8c-8d however, this alternative embodiment may include modified features and feature placements. For example, the alternative embodiment of FIGS. 8c-8d may include a handle 105 as described above, a spout 305 and reservoir port 307 positioned off centered as opposed to the centered positioning of the spout 305 and reservoir port 307 of system 100 and a ramped surface 301 directing the fluid toward the reservoir port 307.

The alternative embodiments of FIG. 8e-8f depict a feature allowing to change the appearance of fluid reservoir 101, to be altered or modified using one a covering or decorative sleeves 201. The decorative sleeve 201 may act as a slip cover that may fit over the fluid reservoir 101. The sleeve 201 may include decorative prints and designs that may be used to customize the look of the watering system and the fluid reservoir 101. For instance, the sleeve 201 may include holiday or winter themed patterns in some embodiments. In alternative embodiments, the sleeve 101 may appear to resemble wrapped packages or gifts. The decorative sleeve 201 may be constructed out of any stretchable, elastomeric or form fitting material capable of conforming over the exterior surface of the fluid reservoir 101. For example, the material of the sleeve 101 may be constructed out of nylon, neoprene, polyester, elastane, spandex, cotton or combination fabric blends used by individuals skilled in the art. Embodiments of the sleeve 201 may include a viewing window 204 cut out of the sleeve's 201 fabric. Embodiments of the viewing window may allow a user to view the fluid reservoir 101 underneath the sleeve and further view the reservoir fluid level 206 inside of the fluid reservoir 101 despite the presence of the fabric sleeve 201. The presence of the viewing window 204 may allow a user to identify the amount of fluid 155 inside of the fluid reservoir 101 without having to remove the sleeve 201 from the exterior surface of the fluid reservoir 101.

Figure 8G:
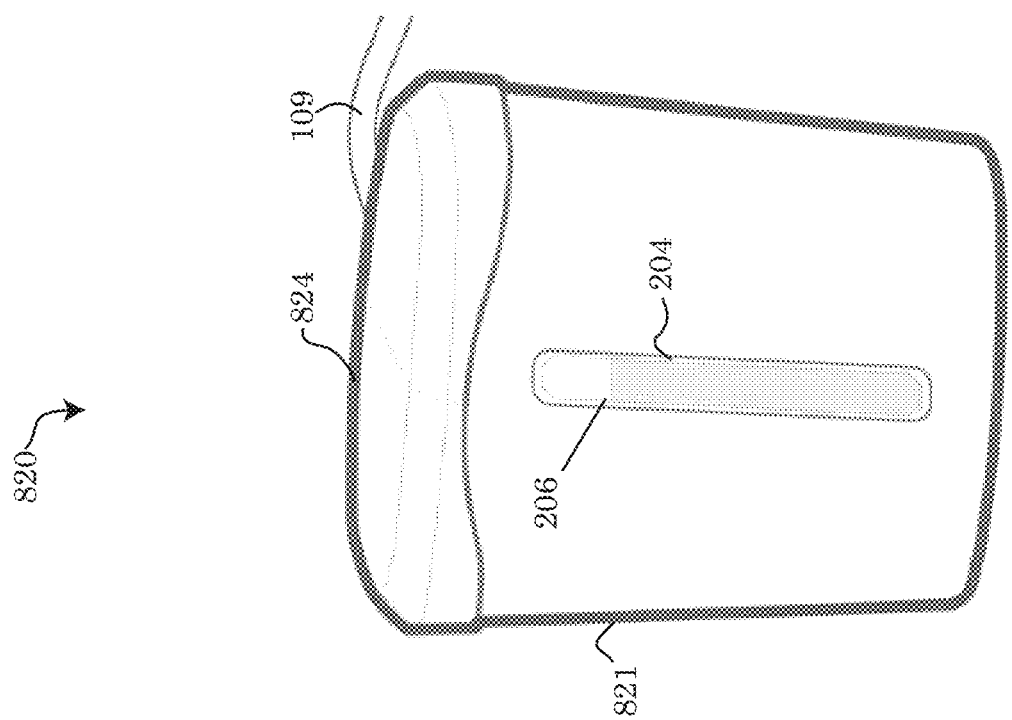
FIG. 8g depicts a fourth alternative embodiment of a Christmas tree watering system in a first configuration.

FIG. 8g-8h depict yet another alternative embodiment 820 of a watering system. Similar to the embodiment 800, the alternative embodiment 820 includes a combined base unit 824 integrating the fluid storage capacity of a fluid reservoir into the housing of the base unit comprising each of the components of the base unit 103 described herein. Features depicted in embodiment 820 that differ from embodiment 800 may include a removable cover 824 which may be connected conduit 109 and pump 501 as opposed to the removable or rotatable cover 804 which is separately detachable from the pump 501 and conduit 109. Moreover, the shape of the fluid storage of the combined based unit 821 sports a different shape that is an elliptical shaped cylinder as opposed to the rectangular, squared or rounded-rectangular looks of the other embodiments of FIGS. 1-3, 4 and 8a-8b.

Similar to FIGS. 8g-8h, alternative embodiment 830 of FIGS. 8i-8j depicts a yet another design to the components described herein. The shape of the fluid storage container 831 in embodiment 830 in a combined fluid reservoir and base unit is cylindrical in appearance and includes a cover 834 that may be connected or integrated with the pump 501 and conduit 109. In some embodiments, the embodiments of the watering systems described herein may include a platform 833 as shown in alternative embodiment 830. The platform 833 may receive, connect or integrate with the bottom of the base unit 103 or combined base unit systems 801, 821, 831 in order to raise the base units off of the ground.

Embodiments of the watering system 100 may, in some embodiments, include a computer system 502, described briefly above. Embodiments of the computer system 502 may be responsible for controlling the pumping operations of pump 501, monitoring the fluid level 120 of the tree stand 151 via one or more sensors 111 and further monitoring the orientation of the tree attachment device 110 via the tilt sensor 701. Embodiments of the computer system 502 may take on a variety of configurations that may be specialized based on the needs of the user of the watering system 100. The computer system may be complex or relatively simple. The placement of the computer system may also vary from embodiment to embodiment. In some embodiments, the computer system 502 may be placed within the base unit 103. In alternative the computer system 502 may be integrated into the tree attachment device 110.

In some embodiments, the computer system 502 may a simple system having specialized circuitry, hardware and software components. For example, the computer system 502 may be generically described as having a processor 991 (such as a CPU), one or more memory device 994, 995 and one or more input devices 992 and/or output devices 993 as shown in the generic computer system 1000 of FIG. 10. Embodiments of the computer system 502 may be more simplified by using a microcontroller having the processor 991, memory device 994, 995 and the input/output devices 992, 993 on a single integrated circuit. In one exemplary embodiment, the computer system 502 may be constructed out of a microcontroller attached to a printed circuit board (PCB) comprising a pump controller 903, a 9v DC transformer power supply and a plurality of wires connecting the to the tilt sensor 701 and one or more sensors 111.

Figure 9A:
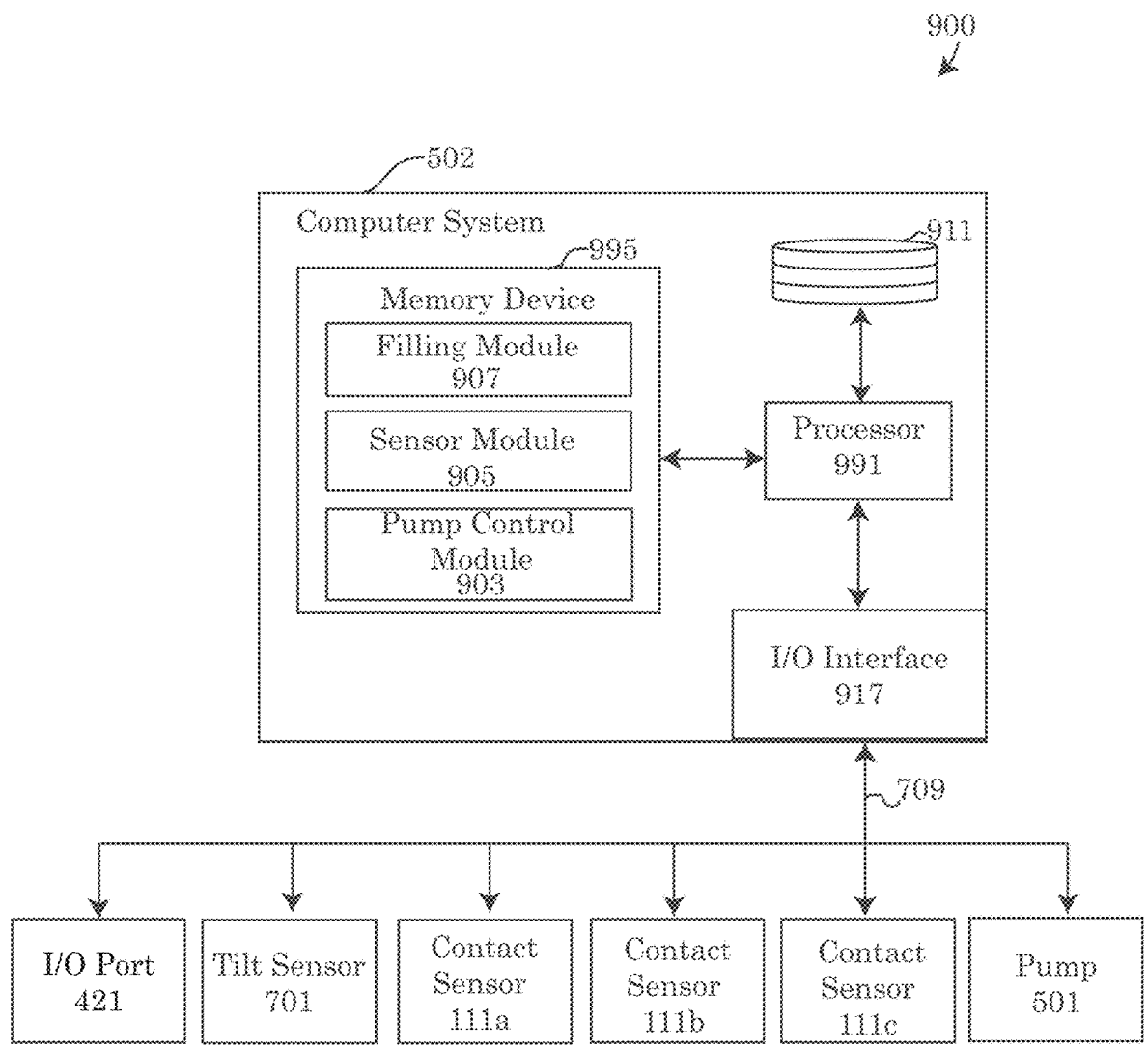
FIG. 9a depicts an embodiment of a computer system for automatically watering a Christmas tree.

In FIG. 9*a*, the drawings depict one embodiment 900 of a computer system 502 that may be integrated into the watering system 100. The computer system 502 may be a specialized computer system, having specialized configurations of hardware, software or a combination thereof. The computer system 502 may comprise not only the elements depicted in FIG. 9*a*-9*b*, but may also incorporate one or more elements of a generic computer system 1000 as depicted in FIG. 10 (described in detail below). Embodiments of the computer system 502 may include one or more modules performing each of the tasks or routines assigned to the computer system 502. The term "module" may refer to may refer to a hardware based module, software based module or a module may be a combination of hardware and software resources. A module (whether hardware, software, or a combination thereof) may be designed to implement or execute one or more particular functions, tasks or routines. Embodiments of hardware based modules may include self-contained components such as chipsets, specialized circuitry and one or more memory devices. A software-based module may be part of a program code or linked to program code containing specific programmed instructions loaded in the memory device 995 of the computer system 502 or a remotely accessible memory device of a network accessible computer system 920 remotely accessed via a network 920.

In some embodiments of the computer system 502, the computer system 502 may comprise a pump control module 903. The pump control module 903 may perform the task or function of activating and deactivating the operations of the pump 501. The pump control module 903 may initiate the pump 501 when indicated to do so by the sensors 111 and/or as commanded to do so by the sensor module 905. Moreover, the pump control module 903 may also terminate pumping operations when instructed to do so by the sensor module 905, the sensors 111, the tilt sensor 701 and/or by a timer of the filling module 907. The electrical signals may be transmitted to and from the computer system 502 to each of the sensors 111, 701 as well as the electrical signals between the computer 502 and pump 501 may be transmitted and received via an input/output (I/O) interface 917 and/or an accessible I/O port 221 which may be positioned on the exterior surface of the base unit 103. For example, the I/O port may be a universal serial bus (USB) port, mini USB, micro USB, firewire, Thunderbolt or other data transmitting port known by a person skilled in the art. The I/O interface 917 and/or the I/O port 221 may include any system for exchanging information to or from an input device 992 (i.e. the sensors 111, 701 a third party computing device such as a Raspberry Pi® or other microcontroller) or an output device 993 (i.e. the pump 501).

Embodiments of the computer system 502 may further comprise a sensor module 905. The sensor module 905 may transmit and receive the electrical signals from each of the fluid level sensors 111 and tilt sensor 701. As noted above, in some embodiments, the sensors 111 may be part of a continuity circuit that may be completed between on or more of the contact sensors 111 as a function of contacting the fluid 155. As the fluid level 120 is reduced, the contact sensors 111 may lose contact with the fluid 155, causing one or more contact sensors to break the circuit. In the exemplary embodiment, once each of the contact sensors 111 break contact with the fluid, the sensor module 905 may signal the pump control module 903 to activate the pump 501. Moreover, as the fluid is transferred from the fluid reservoir 101 to the tree stand 151, the contact sensors 111 may each begin coming in contact with the fluid 155 again. Accordingly, the sensor module 905 may identify each sensor 111*a*, 111*b*, 111*c* as the sensors re-establish the circuit again. The sensor module 905 may signal to the pump control module 903 to deactivate the pump 501 upon the sensor module 905 identifying each of the sensors 111 completing the circuit with the fluid 155 again.

In some embodiments of the computer system 502, the sensor module 905 may also track and monitor the orientation of the tilt sensor 701. As described above, the tilt sensor 701 may establish a y-axis aligned with the tree attachment device 110 in an upright position (approximately 90 degrees). Upon a change in the orientation of the tilt sensor 701 as a function of a change in the tree attachment device's 110 orientation, the sensor module 905 may receive a signal from the tilt sensor 701 indicating the misalignment of the tilt sensor 701 and thus the tree attachment device 110. The sensor module 905 may prevent the pump control module 903 from activating the pump 501 while the tilt sensor 701 is not properly aligned.

Embodiments of the computer system 502 of the automated watering system 100, may further comprise, in some instances, a filling module 907. The filling module 907 may be responsible for monitoring and maintaining proper filling operations during the transfer of fluid between the fluid reservoir 101 and the tree stand 151, while the pump 501 is activated. In some embodiments, the filling module 907 may include a timer that may activate along with pump 501. The timer may be pre-programmed to count up to a certain length of time. Upon reaching the pre-programmed time, the timer may send a signal to the pump control module 903 to deactivate the pump if the pump 501 is still activated after the maximum allotted time for filling has been reached. The filling module's 907 timer may act as a fail-safe in case pumping operations do not complete successfully or an error has occurred. Instead of having the pump 501 continuously pump fluid.

Moreover, in some embodiments, the filling module 907 may also receive and track the electrical load or voltage being used by the pump 501. As a function of the voltage or electrical load received, the filling module 907 may determine whether the pump 501 is transferring fluid 155 from the reservoir 101 or air which may be an indication that the reservoir may be empty. The filling module 907 may make the determination of whether fluid or air is being pumped by the amount of voltage or electrical load being drawn by the pump 501. Transferring fluid requires a higher electrical load or voltage to be drawn than to transfer air. Accordingly, if the pump 501 has been activated by the pump control module 903, but the filling module's 907 readings of the voltage are lower than a programmed level for pumping fluid 155, the filling module may signal the pump control module 903 to cease the pumping operations by the pump 501. Additionally, the filling module may cause the computer system 502 to emit a signal indicating that the fluid reservoir 101 is out of fluid 155. For example, the computer system 502 may activate or emit a light, a sound.

Figure 9B:
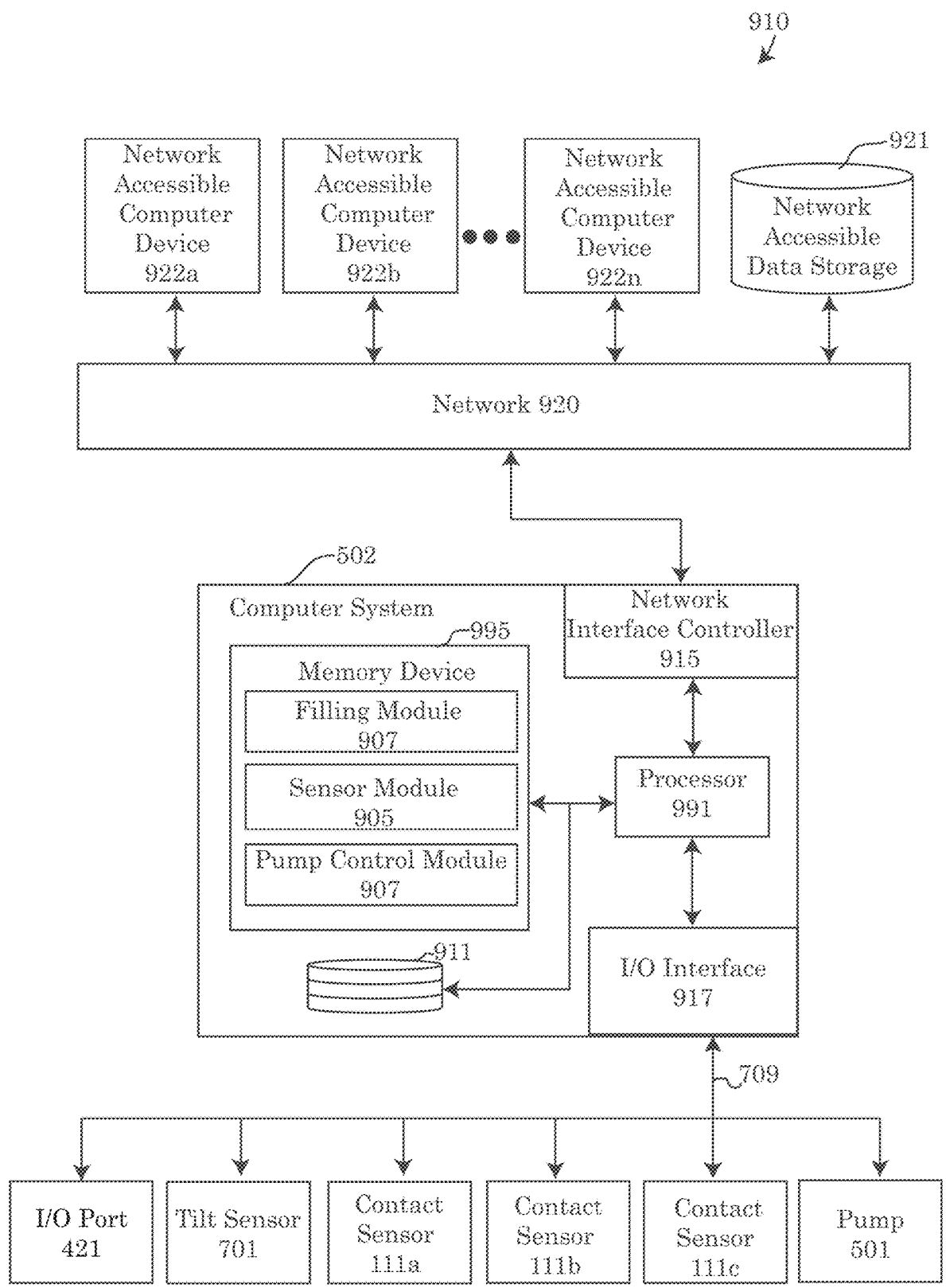
FIG. 9b depicts an alternative embodiment of a computer system for automatically watering a Christmas tree.
Figure 10:
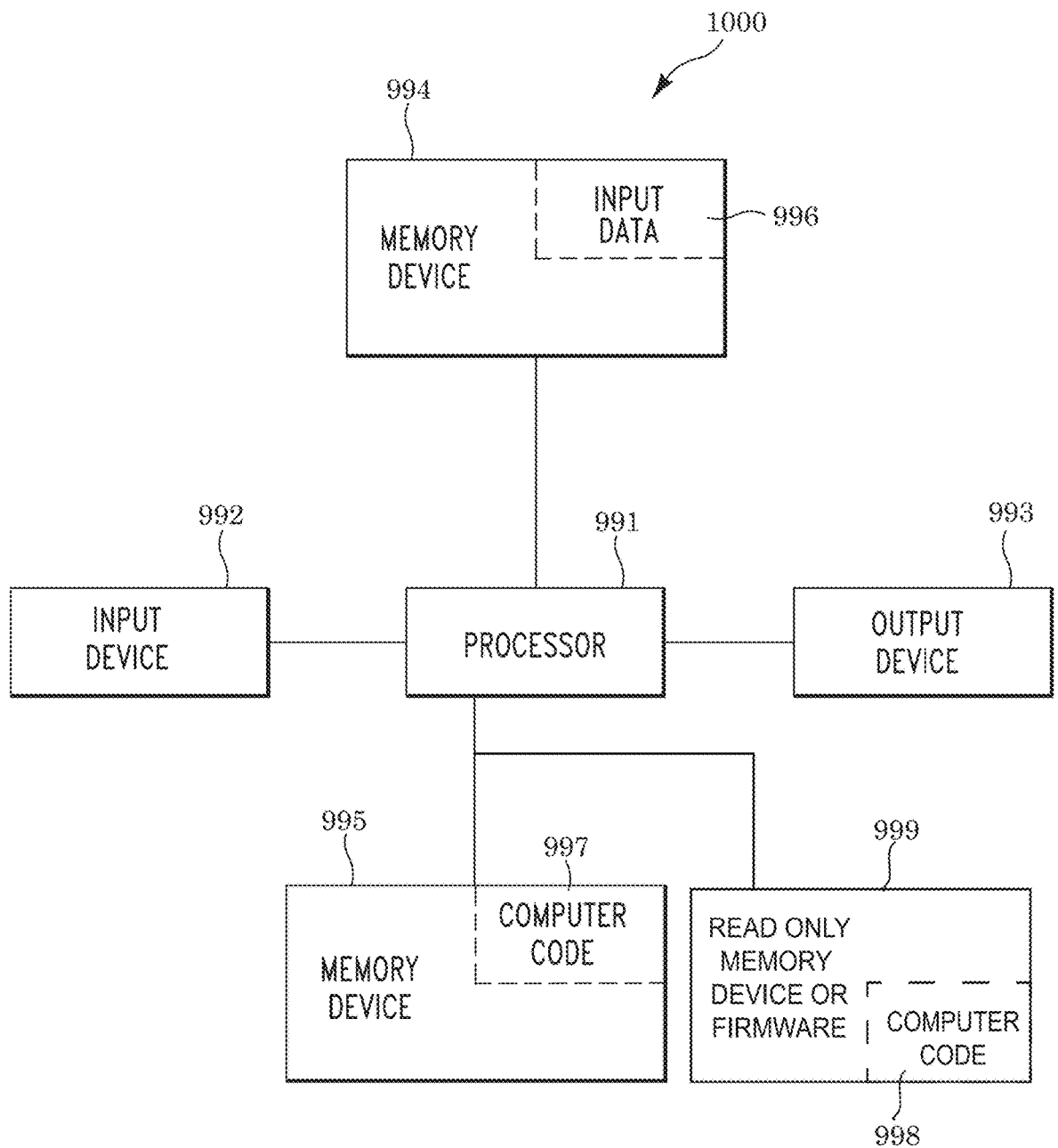
FIG. 10 depicts an embodiment of a generic computer system capable of implementing methods for automatically watering a Christmas tree consistent with the embodiments described in this application.

In some embodiments, such as the embodiment 910 depicted in FIG. 9*b*, the computer system 502 may be capable of connecting to a computer network 920 via wired or wireless hardware connections. As shown in the exemplary embodiment, the computer system 920 may connect to the network 920 using a network interface controller (NIC) 915. Embodiments of the NIC 915 may implement specialized electronic circuitry allowing for communication using a specific physical layer and data link layer standard such as Ethernet, Fiber channel, Wi-Fi or Token Ring. The NIC 915 may further allow for a full network protocol stack, enabling communication over network 920 to a group of computer systems 922a, 922b . . . 922n (referred to collectively as "network accessible computer 922") or other computing hardware devices linked together through communication channels, such as a network accessible data storage device 921. The network 120 may facilitate communication and resource sharing among the computer systems 101, 121, 131 as well as network accessible hardware devices. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

The network enabled embodiment 910 of the computer system 502 may allow for additional features to be incorporated into the watering system 100. For example, a network 920 computer system 502 may be able to deliver data about the watering system 100 to one or more network accessible computers 922. The computer system 922 may be able to administer push notifications, emails, direct messaging via a messaging service, SMS text messages, etc. over the network to each of the networked computer systems. For instance, the network computer systems may be desktop, laptop, tablet or mobile computing devices. The computer system 502 may send update notifications to a user's network accessible computing device 922, including status notifications and errors regarding of the watering system 100 including the status of the fluid reservoir 101 and the tree stand (indicating as either full or empty). In some embodiments, the computer system 502 may transmit alerts to networked computer devices 922 indicating errors such as a tilt sensor error, pumping error, etc. In some embodiments, network accessible computer devices may view the fluid levels 120 of the stand and/or fluid reservoir 101 and manually command the computer system 502 to fill the tree stand 151.

Method for Automatically Watering a Christmas Tree

Figure 11:
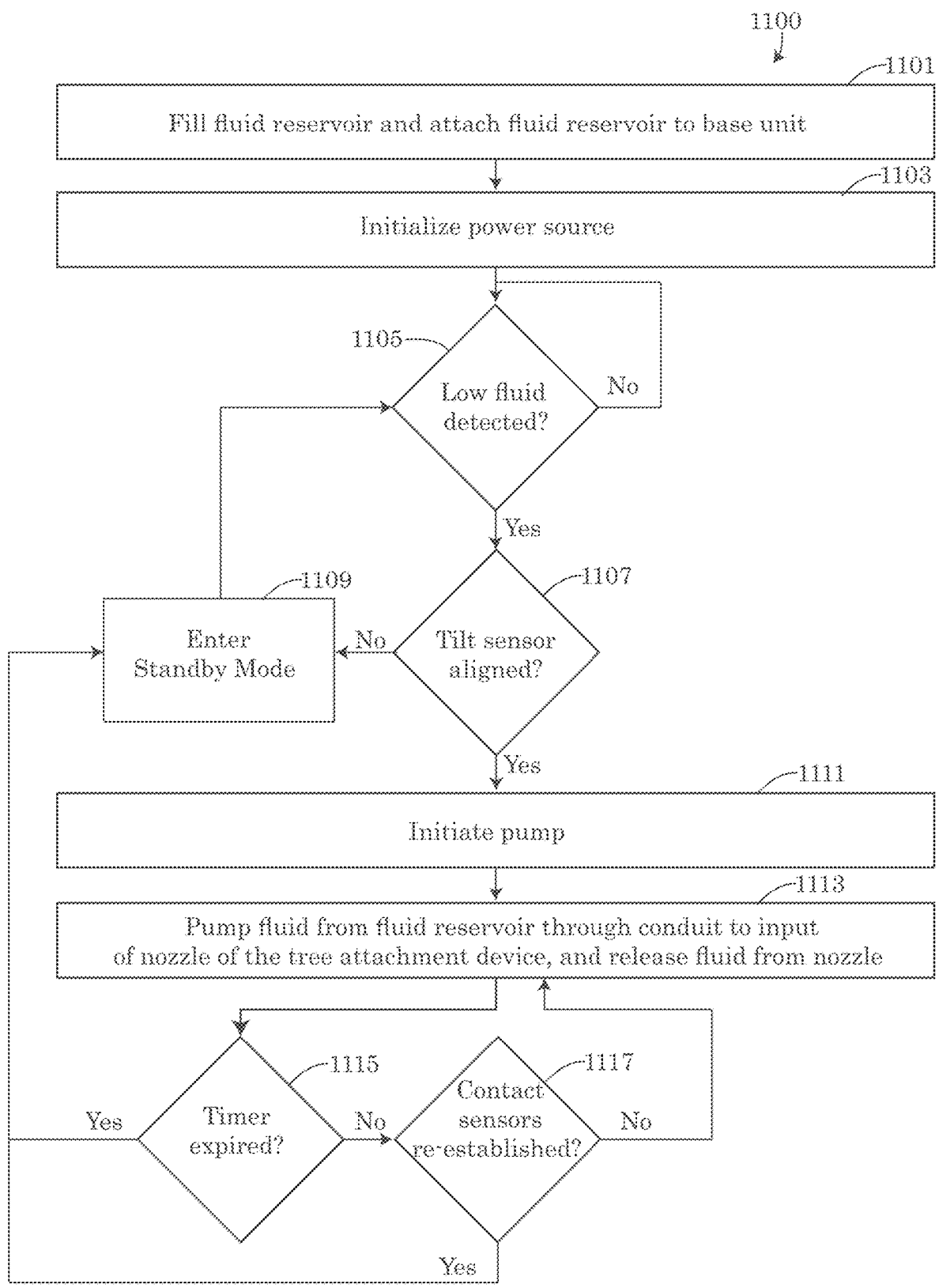
FIG. 11 depicts an embodiment of a computer algorithm for automatically watering a Christmas tree.

The drawing of FIG. 11 represents an embodiment of a method or algorithm that may be implemented for automatically watering a Christmas tree in accordance with the automated watering system 100 described in FIGS. 1-10. A person skilled in the art should recognize that the steps of the algorithm described in FIG. 11 may be performed in a different order than presented by FIG. 11 and the algorithm may not require all of the steps described herein to be performed. Rather some embodiments may deliver targeted campaign notifications using only one or more of the steps discussed below.

The embodiment of the method 1100 for automatically watering a Christmas tree may begin at step 1101. In step 1101, the user may fill the fluid reservoir 101 with fluid 155 from a fluid source 401 as depicted in FIG. 4. The fluid reservoir 101 in some embodiments may be filled as a single unit having a combined base unit 103 and fluid reservoir. In the exemplary embodiment, the fluid reservoir 101 may be separated from the base unit 103. Once filled with fluid 155, the fluid reservoir 101 may be reattached to the base unit 103, by inserting the fluid reservoir into the interior cavity 303 of the base unit 103.

In step 1103, a user may initiate the power source 130 of the watering system 100 having the combined fluid reservoir 101 inserted into the base unit 103. Upon initializing the power source 130, the computer system 502 may determine whether the amount of fluid in the tree stand is considered low in step 1105. Determining a low level of fluid 155 in the tree stand 151 may be accomplished by the presence of absence of electrical continuity with each of the contact sensors 111. If, in step 1105, the fluid level 120 is below the contact sensors 111a, 111b and 111c, the computer system 502 and more particularly the sensor module 905 may determine that the fluid level 120 is considered low.

In some embodiments, if the fluid level 120 is not below contact sensors 111a, 111b and 111c, the system 100 may continue to monitor the contact between the contact sensors 111 and the fluid 155. Conversely, if in step 1105 the fluid level 120 is below each of the contact sensors 111, the computer system 502 may perform a second sensor check to determine in step 1107 whether the tilt sensor 701 is properly aligned. A misaligned tilt sensor 701 may prevent the system 100 from initializing the pump 501 and instead, the system 100 may enter standby mode in step 1109 as the system 100 continues to monitor the fluid level 120 and the tilt sensor 701.

If, however, in step 1107, the computer system 502 determines that the tilt sensor 701 is properly aligned, the system 100 may proceed to initiate pump 501 in step 1111. In step 1111, the pump control module 903 may signal to the pump 501 to deliver fluid 155 from the fluid reservoir 101. The fluid 155 from the fluid reservoir 101 may be drawn, via a first conduit connected to the fluid reservoir 101, into the input of the pump 501. The pump 501 may pressurize the fluid 155 and eject the fluid out of the pump 501's output, discharging the fluid 155 along a second conduit, transferring the fluid 155 to the input of the nozzle 113 in step 1113. Upon reaching the input of the nozzle 113 within the tree attachment device 110, the fluid may be ejected from the outlet 813 of the nozzle into the tree stand 151.

Embodiments of the system 100 may continue to transfer fluid 155 from the fluid reservoir 101 to the tree stand while the system 100 performs one or more checks to determine whether or not pumping operations should be deactivated. In step 1115, the system 100 may check the timer of the filling module and compare the current time on the timer with the maximum allotted time for filling the tree stand 151 during the filling phase. In some embodiments of the system 100, the maximum allotted time may vary. Embodiments of the system 100 may change the pre-programmed maximum allotted time for the filling phase to commence in step 1113 depending on whether the current pumping phase is being performed on initial start-up or a subsequent re-filling phase. During the initial startup filling phase, the maximum allotted time for filling the tree stand may be extended or longer than the subsequent re-filling phases. During step 1115, if the watering system 100 determines that the timer has expired the computer system 502 may cease pumping operations and place the watering system 100 into standby mode of step 1109. Likewise, if the timer has not expired in step 1115, the computer system 502 of the watering system 100 may proceed to step 1117.

Step 1117 may perform the action of determining whether or not each of the contact sensors 111 have re-established continuity with the fluid 155. If, the contact sensors 111a, 111b and 111c have not re-established contact with the fluid 155 in the tree stand 151, the system 100 may proceed to step 1113 and continue to pump the fluid from the fluid reservoir until the timer has expired in step 1115 or the contact sensors 111 have re-established continuity with the fluid 155. Once contact has been re-established between the contact sensors 111 and the fluid 155, the watering system 100 may enter standby mode 1109, wherein the computer system 502 may continue to monitor each of the contact sensors in step 1105. Alternatively, in some embodiments, if the tilt sensor 701 has been disturbed since the initial check in step 1107, the pump 501 may also cease operations and be placed in standby mode 1109.

Computer System

Referring to the drawings, FIG. 10 illustrates a block diagram of a computer system 1000 that may be included in the systems of FIGS. 1-9b and for implementing methods automatically watering a Christmas tree as shown in the embodiment of FIG. 11 and in accordance with the embodiments of the present disclosure. The computer system 1000 may generally comprise a processor 991, otherwise referred to as a central processing unit (CPU), an input device 992 coupled to the processor 991, an output device 993 coupled to the processor 991, and memory devices 994 and 995 each coupled to the processor 991. The input device 992, output device 993 and memory devices 994, 995 may each be coupled to the processor 991 via a bus. Processor 991 may perform computations and control the functions of computer 1000, including executing instructions included in the computer code 997 for tools and programs for automatically watering a Christmas tree, in the manner prescribed by the embodiments of the disclosure using the systems of FIGS. 1-9b, wherein the instructions of the computer code 997 may be executed by processor 991 via memory device 995. The computer code 997 may include software or program instructions that may implement one or more algorithms for implementing the methods for automatically watering a Christmas tree, as described in detail above. The processor 991 executes the computer code 997. Processor 991 may include a single processing unit, or may be distributed across one or more processing units in one or more locations (e.g., on a client and server).

The memory device 994 may include input data 996. The input data 996 includes any inputs required by the computer code 997. The output device 993 displays output from the computer code 997. Either or both memory devices 994 and 995 may be used as a computer usable storage medium (or program storage device) having a computer readable program embodied therein and/or having other data stored therein, wherein the computer readable program comprises the computer code 997. Generally, a computer program product (or, alternatively, an article of manufacture) of the computer system 1000 may comprise said computer usable storage medium (or said program storage device) 911, 921.

Memory devices 994, 995 include any known computer readable storage medium, including those described in detail below. In one embodiment, cache memory elements of memory devices 994, 995 may provide temporary storage of at least some program code (e.g., computer code 997) in order to reduce the number of times code must be retrieved from bulk storage while instructions of the computer code 997 are executed. Moreover, similar to processor 991, memory devices 994, 995 may reside at a single physical location, including one or more types of data storage, or be distributed across a plurality of physical systems in various forms. Further, memory devices 994, 995 can include data distributed across, for example, a local area network (LAN) or a wide area network (WAN). Further, memory devices 994, 995 may include an operating system (not shown) and may include other systems not shown in FIG. 10.

In some embodiments, rather than being stored and accessed from a hard drive, optical disc or other writeable, rewriteable, or removable hardware memory device 994, 995, stored computer program code 998 (e.g., including algorithms) may be stored on a static, non-removable, read-only storage medium such as a Read-Only Memory (ROM) device 999, or may be accessed by processor 991 directly from such a static, non-removable, read-only medium 1199. Similarly, in some embodiments, stored computer program code 997 may be stored as computer-readable firmware 999, or may be accessed by processor 991 directly from such firmware 999, rather than from a more dynamic or removable hardware data-storage device 995, such as a hard drive or optical disc.

In some embodiments, the computer system 1000 may further be coupled to an Input/output (I/O) interface 917 and a computer data storage unit 911. An I/O interface 917 may include any system for exchanging information to or from an input device 992 or output device 993. The input device 992 may be, inter alia, a keyboard, a mouse, sensors, pump, camera, timer, etc. The output device 993 may be, inter alia, a printer, a plotter, a display device (such as a computer screen or monitor), a magnetic tape, a removable hard disk, a floppy disk, etc. The memory devices 994 and 995 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 1000, and may include any type of transmission link, including electrical, optical, wireless, etc.

An I/O interface 917 may allow computer system 1000 to store information (e.g., data or program instructions such as program code 997) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that campaign notifications to deploy or integrate computing infrastructure with respect to accessing content of a shared account. Thus, an embodiment of the present invention discloses a process for supporting computer infrastructure, where the process includes providing at least one support service for at least one of integrating, hosting, maintaining and deploying computer-readable code (e.g., program code 997) in a computer system (e.g., computer 1000) including one or more processor(s) 991, wherein the processor(s) carry out instructions contained in the computer code 997 causing the computer system to automatically water a Christmas tree s. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method automatically watering a Christmas tree. Thus the present invention discloses a process for supporting, deploying and/or integrating computer infrastructure, integrating, hosting, maintaining, and deploying computer-readable code into the computer system 10000, wherein the code in combination with the computer system 1000 is capable of automatically watering a Christmas tree.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. An automated Christmas tree watering system comprising:
    a base unit comprising an interior cavity housing a pump having an intake and an output;
    a fluid reservoir configured to supply a fluid from inside the fluid reservoir to the intake of the pump;
    a conduit having a first end and a second end, wherein the output of the pump is connected to the first end of the conduit, and wherein the second end provides the fluid to a reservoir of a tree stand;
    a first siphon break positioned between the first end and the second end of the conduit, wherein the first siphon break is a hole in the conduit, further wherein the first siphon break is located within the interior cavity of the base unit; and
    a second siphon break positioned at the second end of the conduit;
    wherein the system is configured to pump the fluid from the fluid reservoir to the reservoir of the tree stand through the conduit, regardless of whether the fluid reservoir is located above, below, or level with the reservoir of the tree stand;
    wherein the first siphon break prevents formation of a forward siphon that would empty the fluid from the base unit, and the second siphon break prevents formation of a reverse siphon that would draw the fluid from the reservoir of the tree stand.

2. The automated Christmas tree watering system of claim 1, further comprising:
    a sensor system connected to the conduit proximate the second end of the conduit, wherein the sensor system is configured to detect a fluid level within the reservoir of the tree stand.

3. The automated Christmas tree watering system of claim 2, wherein the sensor system comprises a plurality of sensors having two or more different lengths;
    a first sensor of the plurality of sensors is a length configured to position the first sensor at a depth above a bottom surface of a tree trunk positioned in the tree stand; and
    a second sensor, of the plurality of sensors, is a length configured to position the second sensor at a height below a maximum fluid level of the tree stand.

4. The automated Christmas tree watering system of claim 1, wherein the fluid reservoir is air tight and further comprises a removable spring cap, said spring cap introduces air into the fluid reservoir upon insertion of the fluid reservoir into the interior cavity.

5. The automated Christmas tree watering system of claim 4, wherein the base unit further comprises a depression member positioned within the interior cavity, wherein the depression member depresses a spring of the removable spring cap upon insertion of the fluid reservoir into the interior cavity of the base unit.

6. The automated Christmas tree watering system of claim 1, wherein the fluid reservoir is separable from the base unit.

7. The automated Christmas tree watering system of claim 3, further comprising:
    a tree attachment device having a horizontal member connected to a vertical member, said horizontal member houses a portion of the conduit and said vertical member houses the sensor system and a nozzle connected to the second end of the conduit; and
    wherein the second siphon break is created by an outlet of the nozzle.

8. The automated Christmas tree watering system of claim 7, wherein the tree attachment device further comprises:
    a first bore;
    a second bore positioned laterally to the first bore; and
    serrated teeth.

9. The automated Christmas tree watering system of claim 8, wherein the tree attachment device further comprises:
    an attachment mechanism affixed to the tree attachment device, wherein said attachment mechanism is sized to pass through the first bore, second bore and the serrated teeth.

10. The automated Christmas tree watering system of claim 9, wherein the attachment mechanism is a cord.

11. The automated Christmas tree watering system of claim 1, wherein the first siphon break is positioned above a maximum fluid level of the interior cavity.

12. The automated Christmas tree watering system of claim 11, wherein a flow rate of fluid exiting the conduit via the first siphon break is less than 50% of a flow rate of the pump.

13. The automated Christmas tree watering system of claim 7, wherein the tree attachment device further comprises a tilt sensor.

14. The automated Christmas tree watering system of claim 7, further comprising:
    a computer system comprised of a processor, a memory device coupled to the processor;
    and a computer readable storage device coupled to the processor, wherein the computer readable storage device contains program code executable by the processor via the memory device to implement a method for automatically watering a Christmas tree comprising the steps of:
        detecting, by the processor, a low fluid level having a fluid level below the first sensor, below the second sensor and below a third sensor;
        initiating, by the processor, the pump;
        transferring, by the pump, the fluid within the interior cavity via the conduit to the nozzle; and terminating, by a processor, the transfer of the fluid to the nozzle upon the fluid level rising above the first sensor, second sensor and the third sensor.

15. The automated Christmas tree watering system of claim 14, wherein the computer system further comprises an input/output (PO) port accessible from an exterior surface of the base unit.

16. The automated Christmas tree watering system of claim 14, wherein the computer system establishes a wireless network connection.

17. The automated Christmas tree watering system of claim 16, wherein the computer system administers notification to one or more network accessible computer systems connected to the wireless network connection.

18. The automated Christmas tree watering system of claim 14, wherein the computer system is housed within the base unit.

19. The automated Christmas tree watering system of claim 7, wherein the interior cavity further comprises a storage compartment for the tree attachment device.

20. An automated Christmas tree watering system comprising:
  a pump having an output, wherein the pump pumps a fluid;
  a conduit having a first end and second end, wherein the first end of the conduit is in fluid communication with the output of the pump;
  a first siphon break positioned between the first end and the second end of the conduit, the first siphon break formed by a hole in the conduit, wherein the first siphon break permits movement of the fluid through the conduit from the first end to the second end, but prevents formation of a forward siphon that would draw the fluid through the conduit from the first end to the second end;
  a second siphon break, wherein the second siphon break permits movement of the fluid through the conduit from the first end of the conduit to the second end, but prevents formation of a reverse siphon that would draw the fluid through the conduit from the second end of the conduit to the first end; and
  a sensor system proximate to the second end of the conduit;
  wherein the system pumps the fluid from a supply reservoir located at the first end of the conduit to a tree reservoir located at the second end of the conduit;
  wherein the system pumps the fluid from the supply reservoir to the tree reservoir regardless of the relative height of the supply reservoir and the tree reservoir without formation of a siphon.

21. The automated Christmas tree watering system of claim 20, wherein the sensor system further comprises:
  a first sensor configured to detect a presence of the fluid at a fluid level above a bottom surface of a tree trunk within a tree stand; and
  a second sensor configured to detect the presence or absence of the fluid at the fluid level below a maximum fluid level of the tree stand.

22. The automated Christmas tree watering system of claim 20, wherein the supply reservoir is configured to supply the fluid to an intake of the pump.

23. The automated Christmas tree watering system of claim 20, further comprising:
  a tree attachment device having a horizontal member connected to a vertical member, said horizontal member houses a portion of the conduit and said vertical member houses the sensor system and a nozzle connected to the second end of the conduit.

24. A watering system, comprising:
  a pump having an output, wherein the pump pumps a fluid;
  a conduit having a first end and second end, wherein the first end of the conduit is in fluid communication with the output of the pump, and wherein the conduit may be used with either the first end in a higher position than the second end or the second end in a higher position than the first end; and
  a first siphon break and a second siphon break, wherein the first siphon break allows the fluid to move through the conduit from the first end to the second end while preventing formation of a forward siphon that would draw the fluid from the first end conduit to the second end, and wherein the second siphon break allows the fluid to move out of the conduit at the second end while preventing formation of a reverse siphon that would draw the fluid from the second end of the conduit to the first end.

25. The watering system of claim 11, wherein the fluid exiting the conduit via the first siphon break stays within the base unit and is returned to the pump intake.

* * * * *